United States Patent
Mabuchi

(10) Patent No.: US 9,450,937 B2
(45) Date of Patent: Sep. 20, 2016

(54) VEHICLE NETWORK AUTHENTICATION SYSTEM, AND VEHICLE NETWORK AUTHENTICATION METHOD

(71) Applicant: Mitsuhiro Mabuchi, Tokyo (JP)

(72) Inventor: Mitsuhiro Mabuchi, Tokyo (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/442,477

(22) PCT Filed: Dec. 5, 2012

(86) PCT No.: PCT/JP2012/081525
§ 371 (c)(1),
(2) Date: May 13, 2015

(87) PCT Pub. No.: WO2014/087503
PCT Pub. Date: Jun. 12, 2014

(65) Prior Publication Data
US 2015/0350176 A1    Dec. 3, 2015

(51) Int. Cl.
| G06F 21/00 | (2013.01) |
| H04L 29/06 | (2006.01) |
| G06F 21/44 | (2013.01) |
| H04L 9/32 | (2006.01) |
| H04L 29/08 | (2006.01) |

(52) U.S. Cl.
CPC .............. *H04L 63/08* (2013.01); *G06F 21/44* (2013.01); *H04L 9/32* (2013.01); *H04L 9/3271* (2013.01); *H04L 67/12* (2013.01); *G06F 2221/2107* (2013.01); *H04L 2209/84* (2013.01)

(58) Field of Classification Search
CPC .................................................. H04L 9/3271
See application file for complete search history.

(56) References Cited

U.S. PATENT DOCUMENTS

| 8,327,130 | B2 * | 12/2012 | Wilkinson, Jr. | .... H04L 63/0807 |
| | | | | 713/155 |
| 2003/0147534 | A1 * | 8/2003 | Ablay | .......... H04L 9/3271 |
| | | | | 380/270 |
| 2005/0033983 | A1 | 2/2005 | Takekawa et al. | |
| 2007/0050627 | A1 * | 3/2007 | Chiku | .......... H04L 9/3271 |
| | | | | 713/176 |
| 2009/0070617 | A1 * | 3/2009 | Arimilli | .......... G06F 1/12 |
| | | | | 713/400 |
| 2009/0119657 | A1 * | 5/2009 | Link, II | .......... G06F 8/65 |
| | | | | 717/171 |
| 2010/0027520 | A1 | 2/2010 | Yao et al. | |
| 2012/0311340 | A1 * | 12/2012 | Naganuma | .......... G06F 21/35 |
| | | | | 713/176 |

FOREIGN PATENT DOCUMENTS

| JP | 2005-071328 A | 3/2005 |
| JP | 2007-272583 A | 10/2007 |
| JP | 2008-205675 A | 9/2008 |
| JP | 2010-050958 A | 3/2010 |
| JP | 2011-87873 A | 5/2011 |

OTHER PUBLICATIONS

Communication including Extended Search Report in European Application No. 12889412.8 dated Nov. 16, 2015.

* cited by examiner

*Primary Examiner* — Morshed Mehedi
(74) *Attorney, Agent, or Firm* — Sughrue Mion, PLLC

(57) ABSTRACT

Provided is a vehicle network authentication system such that processing by a vehicle control device can be smoothed while security of communication using dummy data is maintained. A vehicle control device as an authenticating entity is provided with an authentication unit that allocates authority in accordance with the amount of authentication of data for authentication transmitted from a vehicle control device as an authenticated entity. The vehicle control device includes an authentication data generation unit that generates the data for authentication, a data division unit that divides the generated data for authentication, and a dummy data addition unit that adds dummy data as data that is transmitted to a vehicle network together with the data for authentication.

14 Claims, 17 Drawing Sheets

| Authentication Rate (Amount Of Verification) | Authority |
|---|---|
| 10% | - |
| 30% | Function A |
| 50% | Function A, B |
| 75% | Function A, B, C |
| 100% | Function A, B, C, D |
| Final Authentication | All Functions |

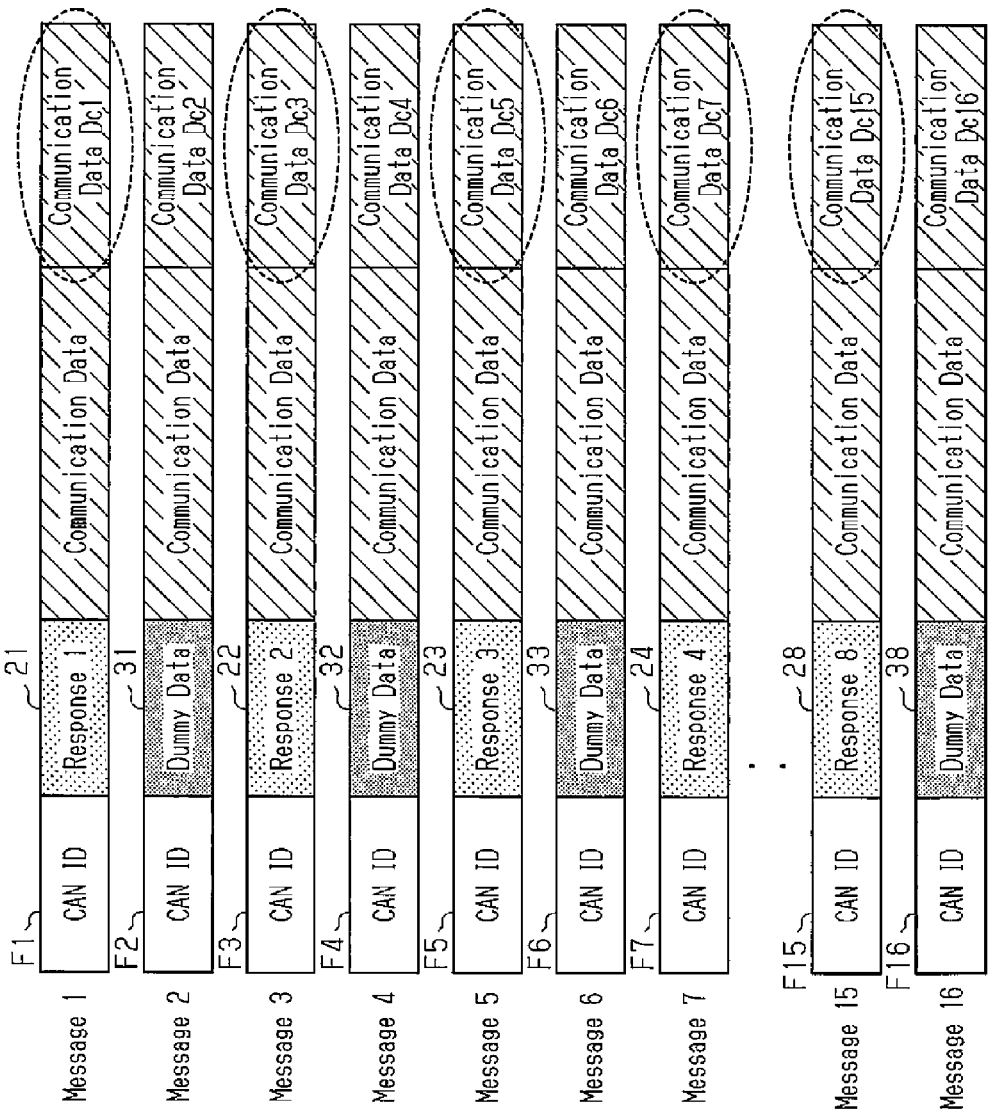

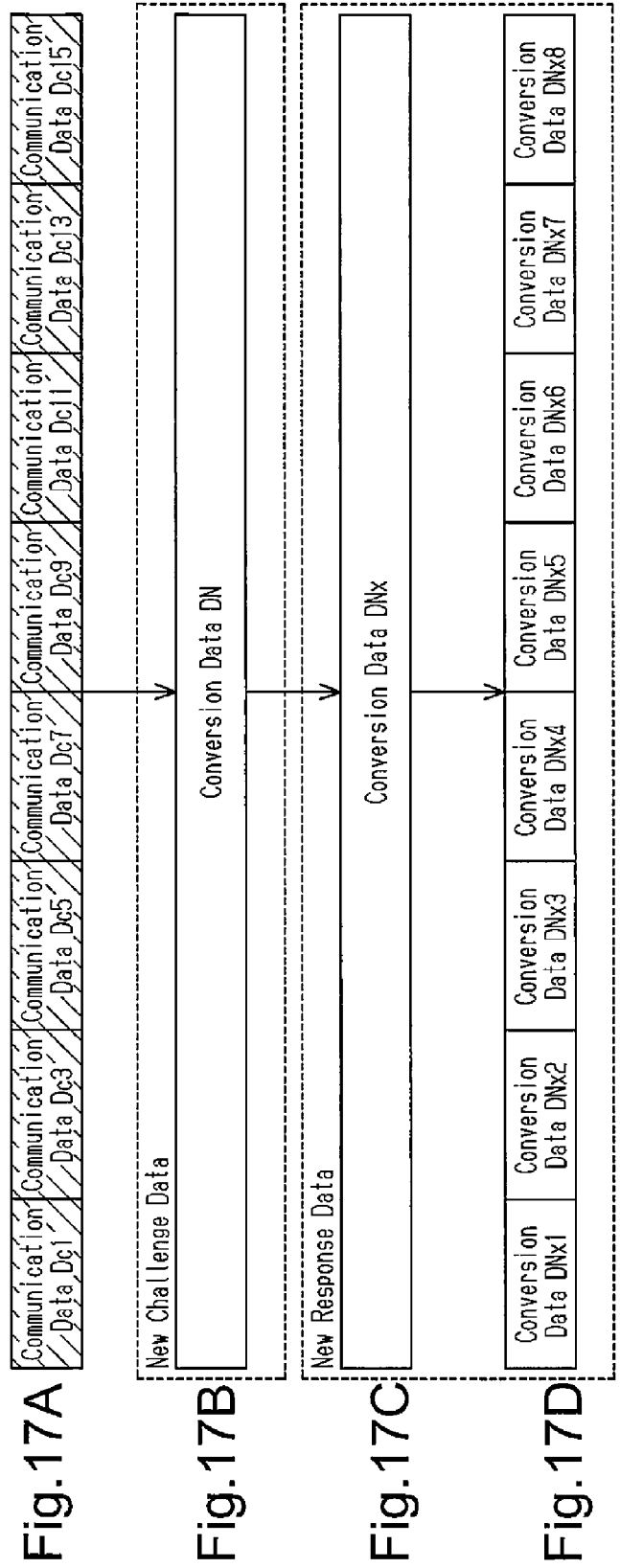

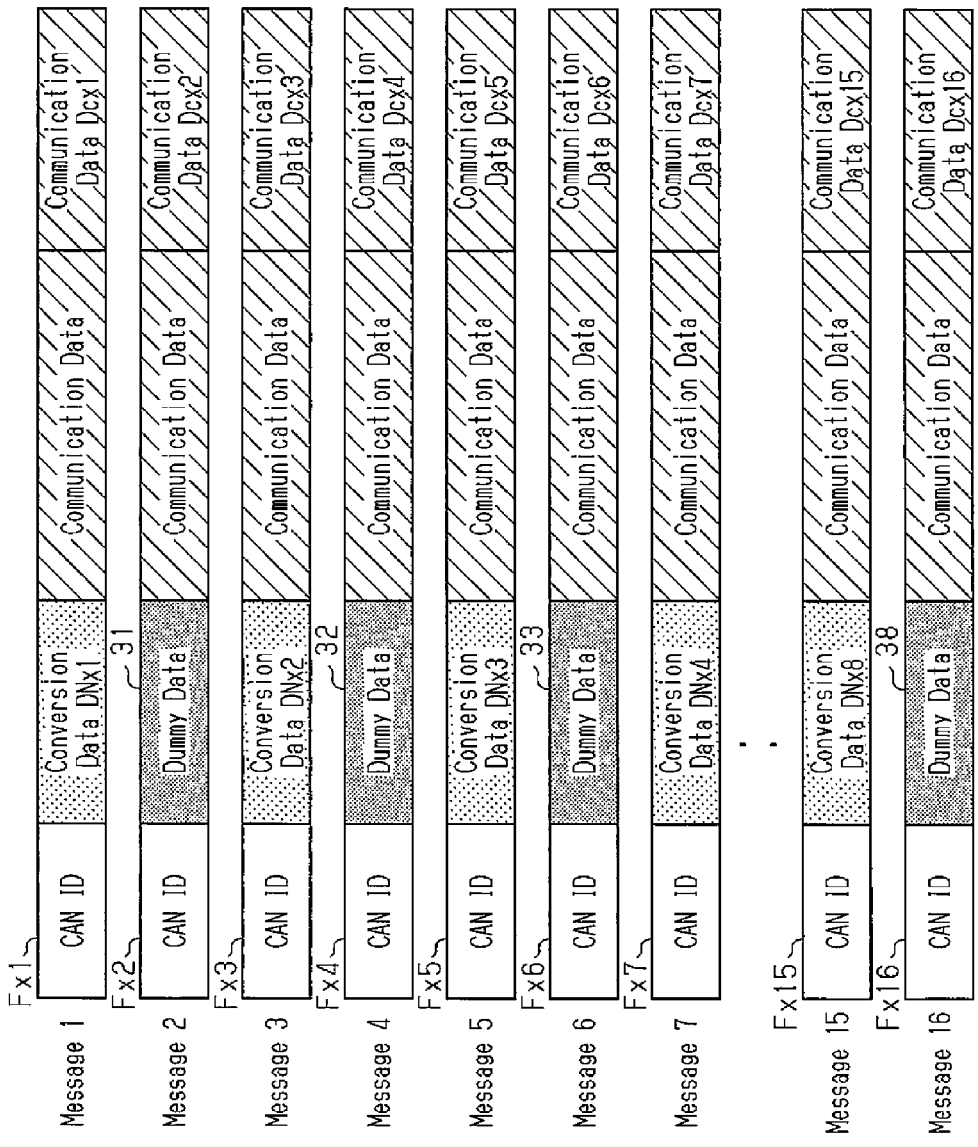

VEHICLE NETWORK AUTHENTICATION SYSTEM, AND VEHICLE NETWORK AUTHENTICATION METHOD

CROSS REFERENCE TO RELATED APPLICATIONS

This application is a National Stage of International Application No. PCT/JP2012/081525 filed Dec. 5, 2012, the contents of all of which are incorporated herein by reference in their entirety.

FIELD OF THE DISCLOSURE

The present invention relates to a vehicle network authentication system and a vehicle network authentication method that use a network mounted in a vehicle.

BACKGROUND OF THE DISCLOSURE

In recent years, vehicles such as automobiles have been equipped with many vehicle control devices, i.e., vehicle control devices that electronically control various pieces of in-vehicle equipment, such as an engine and a brake, and vehicle control devices that control pieces of equipment, such as meters, that display various vehicle states, including a vehicle control device that controls a navigation system. Additionally, in the vehicle, a vehicle network is formed by electrically connecting those vehicle control devices together by means of communication lines, and various pieces of data are transmitted and received between the vehicle control devices through this vehicle network. On the other hand, in the thus formed vehicle network, each vehicle control device connected to the vehicle network serves to control various pieces of in-vehicle equipment, such as an engine and a brake, that are mounted in the vehicle, and hence is required to have significantly-high security.

Therefore, recently, the development of an authentication system to verify the correctness of communication targets or of communication data between the vehicle control devices connected to the vehicle network has been advanced. In this kind of system, communication with a communication target is started on condition that authentication has been established.

Additionally, for example, a data distribution system described in Patent Document 1 has been known as a technique that increases the security of such a specific network. This data distribution system communicates dummy data that is a dummy representation of normal data between a transmitting terminal and a receiving terminal, besides the normal data. The receiving terminal determines whether received data is dummy data or normal data. As a result, it is difficult to identify normal data even if data transmitted to the network is illegally obtained.

PRIOR ART DOCUMENTS

Patent Documents

Patent Document 1: Japanese Laid-Open Patent Publication No. 2010-050958

SUMMARY OF THE INVENTION

Problems that the Invention is to Solve

In reference to the vehicle network, in general, available frequency bands are limited, and the amount of transmissible/receptive data is also limited. Additionally, the number of vehicle control devices that need authentication is great. Therefore, when data for authentication is transmitted to the vehicle network, load to on the network rises, and therefore transmission speed drops. Additionally, if dummy data is transmitted to the vehicle network in order to increase the security of the vehicle network, the network load will become even higher. If measures, such as limitations on the function and the like of a vehicle control device, are carried out until the correctness of a communication target or of communication data is verified, there is a fear that delay will occur in a process that is to be primarily executed by the vehicle control device for a period from start to finish of the authentication of the vehicle control device.

Accordingly, it is an objective of the present invention to provide a vehicle network authentication system and a vehicle network authentication method that are capable of facilitating a process executed by vehicle control devices while maintaining the security of communication that uses dummy data.

To achieve the foregoing objective, the present invention provides a vehicle network authentication system in which communication data is transmitted and received by use of a unit of communication specified based on a communications protocol of a vehicle network. The vehicle network authentication system includes a data dividing section, a dummy data addition section, and an authentication section. The data dividing section divides authentication data for authenticating a communication target. The dummy data addition section adds dummy data for a dummy representation of the divided authentication data. The dummy data is used as data to be transmitted to the vehicle network together with the authentication data. The authentication section verifies the divided authentication data and the dummy data by use of a plurality of pieces of verification data for verifying the divided authentication data and gives authority according to an amount of authentication of the verified authentication data.

To achieve the foregoing objective, the present invention also provides a vehicle network authentication method in which communication data is transmitted and received by use of a unit of communication specified based on a communications protocol of a vehicle network. The vehicle network authentication method includes: a dividing step for dividing authentication data for authenticating a communication target; a dummy data addition step of adding dummy data for a dummy representation of the divided authentication data, the dummy data being used as data to be transmitted to the vehicle network together with the authentication data; and an authentication step for discriminating between the divided authentication data and the dummy data and giving authority according to an amount of authentication of the discriminated authentication data.

According to the aforementioned configuration, authentication data is divided. Additionally, dummy data that makes it difficult to identify this authentication data is generated. Thereafter, when divided authentication data and dummy data are transmitted from an authenticated target, the authentication data and the dummy data transmitted to the vehicle network are verified. Through this verification, the pieces of divided authentication data are verified at any time. As a result of verification, when the correctness of the pieces of authentication data is verified, the pieces of authentication data are authenticated. When the authentication data of which the correctness has been verified increases, the amount of authentication increases in proportion to the increase of the authentication data. Thereupon, authority is given in accordance with this amount of authentication. Therefore, authority is given before all the authentication of the divided authentication data is established. As a result, minimum necessary authority is given when a fixed amount of authentication is established, and a function processable based on the minimum necessary authority is maintained while performing authentication using the pieces of authentication data and the pieces of dummy data.

The pieces of dummy data are transmitted to the vehicle network together with the pieces of authentication data, and therefore, when the authentication data and the dummy data are obtained by an unauthorized means, it becomes possible to cause the misconception that the pieces of dummy data are normal authentication data. Therefore, it becomes difficult for the pieces of authentication data to be identified from among the communication data, and the pieces of authentication data are restrained from being illicitly used.

In accordance with one aspect of the present invention, the authentication section performs authentication by use of the authentication data based on a challenge-response method.

In accordance with one aspect of the present invention, in the authentication step, authentication using the authentication data is performed based on a challenge-response method.

The present invention is effective particularly in the application to authentication based on the challenge-response method. In other words, in authentication based on the challenge-response method, authentication based on challenge data and based on response data is performed, and, as a result, the authentication is adequately performed while minimizing the number of times of communication performed between an authenticating target and an authenticated target in performing the authentication. As a result, even if the number of pieces of authentication data that serve as a verification target is more than one, the pieces of authentication data are smoothly authenticated.

In accordance with one aspect of the present invention, the authentication section transmits challenge data based on the challenge-response method to the vehicle network in order to authenticate a communication target. The data dividing section generates response data based on the challenge data transmitted to the vehicle network and generates the divided authentication data by dividing the generated response data.

In the aforementioned configuration, in authenticating a communication target, the authentication section transmits challenge data to the vehicle network. Thereafter, when the challenge data transmitted to the vehicle network is obtained, the data dividing section generates response data based on this challenge data. Additionally, the data dividing section generates a plurality of pieces of authentication data by dividing this response data. Therefore, if the challenge data is obtained from the authentication section, it becomes possible for the data dividing section to generate a plurality of pieces of authentication data verifiable by means of this authentication section. As a result, authentication is performed based on shared data that is comprehensible only by means of the authentication section and the data dividing section.

In accordance with one aspect of the present invention, the authentication section performs first authentication with respect to a communication target based on the challenge data transmitted to the vehicle network, and performs second and subsequent authentication with respect to the communication target by using, as new challenge data, data in which at least one of communication data transmitted from the communication target and the challenge data has been converted by a common conversion key.

According to the aforementioned configuration, first authentication with respect to a communication target is performed based on the challenge data transmitted by the authentication section to the vehicle network. In other words, authentication is performed through the verification of response data returned as a response of this challenge data.

In the second and subsequent authentications with respect to this communication target, data in which the communication data transmitted from the communication target has been converted by a conversion key is used. This communication data dynamically changes depending on the transmission source of the communication data or depending on time. Therefore, data generated based on these communication data and conversion key tends to become different one whenever it is generated. Therefore, in the second and subsequent authentications, data for use in authentication changes whenever the authentication is performed. Therefore, even if data used once for authentication is illicitly obtained, illicit authentication caused by the fact that this data is misused is restrained. Additionally, according to this, it is only necessary for the authentication section to transmit the challenge data in the first authentication, and there is no need to newly generate challenge data in subsequent authentication, and is no need to distribute generated challenge data to an authenticated target. Therefore, it is possible to reduce a communication load between the authentication section and the authenticated target.

Additionally, in the aforementioned configuration, data in which challenge data has been converted by a conversion key is used in the second and subsequent authentications with respect to a communication target. Therefore, whenever authentication is performed, the challenge data is converted into different data by means of a conversion key. Therefore, even if data used once for authentication is illicitly obtained, illicit authentication caused by the fact that this data is misused is restrained. Likewise, according to this, it is only necessary for the authentication section to transmit the challenge data in the first authentication, and there is no need to newly generate challenge data in subsequent authentication, and is no need to distribute generated challenge data to an authenticated target. Therefore, it is possible to reduce a communication load between the authentication section and the authenticated target.

In accordance with one aspect of the present invention, the vehicle network is provided with a plurality of vehicle control devices. The data dividing section and the dummy data addition section are provided in a vehicle control device on an authenticated side whereas the authentication section is provided in a vehicle control device on an authenticating side. As the first authentication, the authentication section performs authentication to verify correctness of the vehicle control device on the authenticated side while using the vehicle control device on the authenticated side as the communication target. As the second and subsequent authentication, the authentication section performs message authentication to verify correctness of the communication data while using communication data transmitted from the vehicle control device on the authenticated side as the communication target.

In order to maintain security, authentication is often required between vehicle control devices connected to a vehicle network. On the other hand, if the function of a vehicle control device is limited until all the authentications are completed, the fear that the process of the vehicle control device will be delayed arises.

On this point, according to the aforementioned configuration, authority based on the amount of authentication is given, and, as a result, the minimum function of a vehicle control device is secured when a predetermined amount of authentication is reached.

Additionally, in the aforementioned configuration, the correctness of a vehicle control device on the authenticated side is verified in the first authentication. In other words, the correctness of a vehicle control device by which communication data is transmitted and received is verified. Thereafter, in the second and subsequent authentications with this vehicle control device, the correctness of communication data transmitted from the vehicle control device temporarily authenticated is verified. Therefore, even if the authentication of the vehicle control device by which communication data is transmitted and received is temporarily established, the authentication of the correctness of communication data transmitted from this vehicle control device is continuously performed. As a result, the correctness of the vehicle control device and the correctness of the communication data transmitted by the vehicle control device are verified, and security is maintained higher. Additionally, as a result, even if an illegal vehicle control device is erroneously authenticated, it becomes possible for communication data transmitted by the illegal vehicle control device to be identified as unjustified data in the step of authenticating the communication data. Therefore, it becomes possible to allow or forbid or annul the reception of communication data transmitted from the illegal vehicle control device.

In accordance with one aspect of the present invention, based on either the round-robin method or the random method, the data dividing section determines an order of transmission of the divided authentication data.

In the aforementioned configuration, the order of transmission of authentication data is determined based on the round-robin method. If it is based on this round-robin method, the order of transmission of authentication data is determined with predetermined regularity. This makes it possible for the authentication section to easily discriminate between divided authentication data and dummy data. Additionally, this makes it possible for the authentication section to easily identify verification data used when authentication data that is set as a verification target is verified. Therefore, the process employed to verify authentication is performed more smoothly.

Additionally, in the aforementioned configuration, the order of transmission of authentication data is determined based on the random method. According to this, from the fact that the order of transmission of authentication data does not have regularity, it becomes difficult to discriminate between authentication data and verification data and becomes difficult to identify verification data for verifying authentication data. Therefore, even if authentication data and dummy data are obtained by an unauthorized means, the illegal use of this authentication data is further restrained.

In accordance with one aspect of the present invention, when the order of transmission of the pieces of divided authentication data is determined based on the round-robin method, the authentication section verifies correctness of received data in order of reception of data that is a verification target while using the pieces of verification data sequentially in order of transmission determined based on the round-robin method.

In the aforementioned configuration, when the order of transmission of pieces of divided authentication data is determined based on the round-robin method, the authentication section verifies the correctness of the authentication data while using pieces of verification data in order of transmission sequence determined based on the round-robin method. Additionally, the authentication section selects authentication data that is a verification target in order of reception, i.e., in order of transmission sequence determined based on the round-robin method. Therefore, even if the pieces of divided authentication data differ from each other and even if the pieces of divided verification data differ from each other, it becomes possible for the authentication section to easily select verification data for verifying the authentication data.

In accordance with one aspect of the present invention, a1; the authentication section recursively performs a process in which, when one piece of verification data selected from the pieces of verification data and data that is set as a target to be verified coincide with each other, the authentication section authenticates the data that is set as a target to be verified as partial data of the authentication data, and sets, as a target to be verified, data received subsequently to the authentication data that has been authenticated by use of verification data specified as being sequentially subsequent to the verification data used for authentication, and b1; the authentication section recursively performs a process in which, when one piece of verification data selected from the pieces of verification data and data that is set as a target to be verified do not coincide with each other, the authentication section identifies, as the dummy data, the data that is set as a target to be verified, and sets, as a target to be verified, data received subsequently to the data identified as the dummy data by use of the verification data used for authentication.

The pieces of verification data possessed by the authentication section correspond to the pieces of divided authentication data, and each piece of verification data and each piece of authentication data serve as a pair. Therefore, verification data and authentication data serving as a pair coincide with each other, whereas verification data and authentication data not serving as a pair do not coincide with each other. Therefore, it is possible for the authentication section to verify the correctness of authentication data based on whether verification data for use in verification and authentication data coincide with each other.

On the other hand, it is possible for the authentication section to recognize the order of transmission of pieces of authentication data when the order of transmission of pieces of divided authentication data is determined based on the round-robin method. Therefore, it is possible for the authentication section to select verification data used to verify the pieces of divided authentication data based on this order of transmission. Additionally, when dummy data is not transmitted, pieces of selected verification data are sequentially used, and, as a result, it is possible to verify all the authentication data sequentially received. On the other hand, even if pieces of selected verification data are sequentially used when authentication data and dummy data are mixed together in data received by the authentication section, data not coinciding with this verification data, i.e., dummy data will be included in a verification target. Therefore, it is possible for the authentication section to identify that the data not coinciding with this verification data is dummy data.

Therefore, in the aforementioned configuration, when verification data used sequentially and data serving as a verification target coincide with each other, the authentication section authenticates that the data serving as a verification target that has coincided therewith is authentication data. Thereafter, the authentication section calculates the amount of authentication. Furthermore, the authentication section changes verification data used for verification data to verification data specified as being sequentially subsequent to verification data used for established authentication. Thereafter, the authentication section sets authentication data received subsequently to authentication data of which the authentication has been established as a verification target by use of changed verification data. As a result, the pieces of authentication data in which the order of transmission has been determined based on the round-robin method are sequentially authenticated.

Additionally, in the aforementioned configuration, when verification data used sequentially and data serving as a verification target do not coincide with each other, the authentication section identify that the data that is a verification target is dummy data. Thereafter, the authentication section sets data received subsequently to the identified dummy data as a verification target, and performs verification by means of verification data used to verify the dummy data.

This process is recursively performed, and, as a result, even if dummy data is transmitted together with a plurality of pieces of authentication data, it is possible for the authentication section to discriminate whether received data is authentication data or dummy data. Additionally, the amount of authentication is calculated at any time through this process. As a result, discrimination between authentication data and dummy data and the calculation of the amount of authentication are performed smoothly.

In accordance with one aspect of the present invention, when the order of transmission of the divided authentication data is determined based on the random method, the authentication section verifies correctness of the authentication data divided by the data dividing section by recursively using the pieces of verification data.

According to the aforementioned configuration, when the order of transmission of divided authentication data is determined based on the random method, the authentication section verifies the correctness of the authentication data by recursively using a plurality of pieces of verification data. Therefore, it becomes possible for the authentication section to verify the pieces of authentication data by means of the pieces of verification data even when it is not possible to identify verification data corresponding to the pieces of authentication data because it is not possible to identify the order of transmission of received authentication data.

In accordance with one aspect of the present invention, a2; the authentication section recursively performs a process in which, when one piece of verification data selected from the pieces of verification data and data that is set as a target to be verified coincide with each other, the authentication section authenticates the data that is set as a target to be verified as partial data of the authentication data, and identifies, as an order specified in the verification data used for authentication, an order specified in the authentication data that has been authenticated, and the authentication section sets, as a target to be verified, data received subsequently to the authentication data that has been authenticated by use of verification data specified as being sequentially first among the pieces of verification data except the verification data used for authentication, and b2; the authentication section recursively performs a process in which, when one piece of verification data selected from the pieces of verification data and data that is set as a target to be verified do not coincide with each other, the authentication section verifies the data that is set as a target to be verified by sequentially using other verification data except verification data that has been used for authenticating the authentication data, and the authentication section identifies, as the dummy data, the data that is set as a target to be verified on condition that all the verification data and the data that is set as a target to be verified do not coincide with each other.

The pieces of verification data possessed by the authentication section correspond to the pieces of divided authentication data, and each piece of verification data and each piece of authentication data serve as a pair. Therefore, verification data and authentication data serving as a pair coincide with each other, whereas verification data and authentication data not serving as a pair do not coincide with each other. Therefore, it is possible for the authentication section to verify the correctness of authentication data based on whether verification data for use in verification and authentication data coincide with each other.

On the other hand, it is not possible for the authentication section to recognize the order of transmission of pieces of authentication data when the order of transmission of pieces of divided authentication data is determined based on the random method. However, authentication data transmitted in any order coincides with any one of the pieces of verification data. In contrast, data not coinciding with any one of the pieces of verification data becomes data that is not authentication data, i.e., it becomes dummy data. Authentication data that has coincided with a certain piece of verification data corresponds to this verification data. Therefore, it becomes possible to identify the order specified in verification data coinciding therewith as the order specified in authentication data in which authentication has been established. According to this, the order specified in authentication data transmitted at random is identified. In other words, it becomes possible for the authentication section to recognize which one of the pieces of authentication data has been authenticated.

Additionally, in the aforementioned configuration, the authentication section excludes verification data used for established authentication from subsequent verification, and performs recursive verification. Therefore, the number of pieces of verification data used recursively is reduced in proportion to the times of authentication establishment, and, accordingly, discrimination about whether the verification target is authentication data or dummy data is made early. Therefore, it becomes possible to perform smooth authentication although the order of transmission of pieces of authentication data is determined based on the random method.

In accordance with one aspect of the present invention, when all the authentications of the divided authentication data are established, the authentication section combines pieces of authentication data in which authentication has been established together in specified order, and combines the pieces of verification data together in the specified order. The authentication section performs final authentication with respect to a communication target based on whether the combined authentication data and the combined verification data coincide with each other.

In the aforementioned configuration, when all the authentications of pieces of divided authentication data have been established, pieces of authentication data are combined together in specified order. As a result, the divided authentication data is restored to a state in which the data has not yet been divided. The pieces of verification data used to verify the authentication data are also combined together in specified order. Verification data that serves as the pair to restored authentication data is configured in this way.

Additionally, in the aforementioned configuration, final authentication with respect to a communication target is performed based on whether the combined authentication data and the combined verification data coincide with each other. As a result, when the final authentication is established, all the authorities are given, for example, on condition that the communication target is genuine. In contrast, when the final authentication is not established, it is also possible to set the authentication rate at 0%, for example, on condition that there is a possibility that the pieces of divided authentication data might have been transmitted from an illegal device or the like, and is possible to cancel temporarily-given authority. As a result, multiplex authentication is performed by authentication based on the divided authentication data and authentication based on the combined authentication data. Therefore, security is made even higher.

Whether all the authentications of the divided authentication data have been established is determined based on, for example, whether the division number of authentication data recognized in advance by the authentication section has been reached or whether the total of the data amount of authentication data in which authentication has been established has reached the total data amount of authentication data.

In accordance with one aspect of the present invention, the authentication unit uses an authentication rate as the amount of authentication, the authentication rate being calculated from at least one of division results of the number of authentication establishment with respect to a division number of the authentication data and division results of a data amount of authentication data in which authentication has been established with respect to a total data amount of the authentication data.

In the aforementioned configuration, the authentication rate that is calculated from at least one result of division results of the number of authentication establishment with respect to the division number of the authentication data and division results of the data amount of authentication data in which authentication has been established with respect to the total data amount of the authentication data is used as the amount of authentication. If authority is given based on the authentication rate, it becomes possible to accurately give authority in accordance with the degree of authentication even if a change occurs in the division number of authentication data or in the data amount of pieces of divided authentication data.

In accordance with one aspect of the present invention, the vehicle network is provided with a plurality of vehicle control devices. The data dividing section and the dummy data addition section are provided in a vehicle control device on an authenticated side whereas the authentication section is provided in a vehicle control device on an authenticating side. The authentication section changes management authority of an application program installed on at least one of the authenticated side and the authenticating side in accordance with the amount of authentication.

In general, in a vehicle control device, various processes are performed based on installed application programs, and various functions are exerted. From the fact that management authority, such as the execution, the deletion, and the like, of an application program, exerts influence on a process performed by a vehicle control device, the management authority of the application program is required to be strictly given. Additionally, a function that is exerted at an early stage and that has high necessity exists as a function exerted through the execution of an application program, and, with respect to such a function, authority is required to be given at an early stage.

On this point, according to the aforementioned configuration, the management authority of the application program is changed in accordance with the aforementioned amount of authentication. As a result, the minimum management authority based on the application program is given at an early stage. Additionally, the management authority increases in proportion to an increase in the amount of authentication, and an executable function also increases. This makes it possible to execute at an early stage the minimum function, and makes it possible to give authority taking account of authentication results based on a relatively large amount of authentication with respect to an important function.

BRIEF DESCRIPTION OF THE DRAWINGS

FIG. 16 is a diagram showing one example of authentication data and dummy data that are stored in transmission frames.

FIG. 17A is a diagram showing one example of pieces of communication data that have been combined together.

FIG. 17B is a diagram showing one example of conversion data that serves as new challenge data converted by a conversion key.

FIG. 17C is a diagram showing one example of conversion data that serves as authentication data converted by an encryption key.

FIG. 17D is a diagram showing one example of conversion data that serves as divided authentication data.

FIG. 18 is a diagram showing one example of authentication data and dummy data that are stored in transmission frames.

DETAILED DESCRIPTION OF THE PREFERRED EMBODIMENTS

First Embodiment

With reference to FIGS. 1 to 9, a description will be hereinafter given of a vehicle network authentication system and a vehicle network authentication method according to a first embodiment of the present invention.

Figure 1:
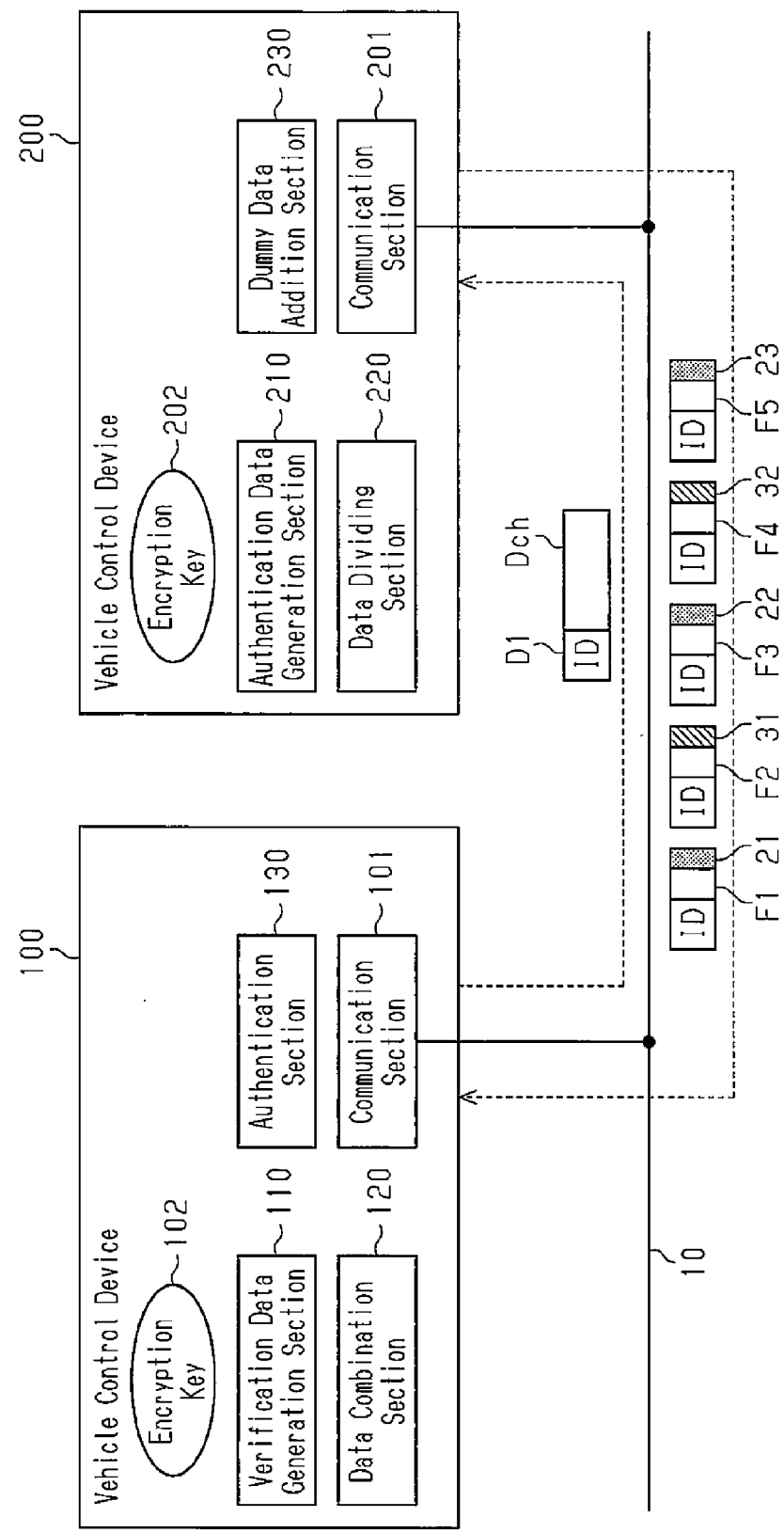
FIG. 1 is a block diagram showing a schematic configuration of a vehicle control device that serves as an authenticating entity and a vehicle control device that serves as an authenticated entity to which a vehicle network authentication system and a vehicle network authentication method according to a first embodiment of the present invention are applied.

As shown in FIG. 1, a communication line 10 forming a vehicle network is provided in a vehicle to which the vehicle network authentication system and the vehicle network authentication method of the present embodiment are applied. This vehicle network is a network to which, for example, a communication system based on a controller area network (CAN) in which communication data is transmitted and received by a frame format is applied. In the present embodiment, communication data is transmitted and received while using a frame as a section.

Several vehicle control devices, such as a vehicle control device 100 and a vehicle control device 200, are connected to the communication line 10.

The vehicle control device 100 and the vehicle control device 200 are devices each of which controls, for example, pieces of equipment and so forth mounted in the vehicle. The vehicle control device 100 and the vehicle control device 200 mutually transmit and receive communication data between these vehicle control devices 100, 200 and so forth when these control devices control various pieces of equipment.

The vehicle control device 100 has a communication section 101 that communicates with the vehicle control device 200 and so forth. The vehicle control device 100 additionally has, for example, a verification data generation section 110 that generates authentication data for verifying the vehicle control device 200 that serves as a communication target and a data combination section 120 that combines pieces of authentication data returned from the communication target together. The vehicle control device 100 still additionally has an authentication section 130 that authenticates the communication target based on the authentication data returned from the communication target. The authentication section 130 of the present embodiment authenticates the communication target based on a challenge-response method.

When communication with the communication target is started, the verification data generation section 110 generates challenge data Dch for use in the authentication of the communication target. The verification data generation section 110 outputs the generated challenge data Dch to the communication section 101. When the challenge data Dch is input, the communication section 101 adds a discrimination code D1 showing a transmission node and data contents to the challenge data Dch. Thereafter, the communication section 101 transmits the challenge data Dch to which the discrimination code D1 has been added to the vehicle control device 200. In this example, the vehicle control device 100 selects, for example, the vehicle control device 200 as a communication target.

The verification data generation section 110 encrypts the same data as the challenge data Dch transmitted to the communication target by use of an encryption key 102. The verification data generation section 110 divides encrypted data into a plurality of pieces of data based on a specified rule. The specified rule to divide the challenge data is a rule that is predetermined, for example, between the vehicle control device 100 and its communication target. The verification data generation section 110 outputs pieces of divided data that have been encrypted to the authentication section 130 as verification data for use in authentication.

The data combination section 120 obtains pieces of authentication data transmitted from, for example, the vehicle control device 200 that is a communication target from the authentication section 130, and then combines pieces of authentication data obtained therefrom together. The data combination section 120 outputs authentication data combined thereby to the authentication section 130.

The authentication section 130 of the present embodiment receives a plurality of transmission frames F1 to F5 . . . transmitted by the vehicle control device 200 that is a communication target, and then takes out authentication data 21, 22, 23 . . . stored in specified positions among the transmission frames F1 to F5 . . . . Furthermore, the authentication section 130 takes out dummy data 31, 32 . . . stored in specified positions among the transmission frames F1 to F5 . . . .

The authentication section 130 discriminates between the authentication data 21, 22, 23, and the like, and the dummy data 31, 32, and the like, taken out therefrom. Thereafter, the authentication section 130 verifies the data 21, 22, 23, and the like, discriminated as being authentication data by means of a plurality of pieces of verification data input from the verification data generation section 110. As a result, the correctness of the pieces of authentication data 21, 22, 23 . . . that have been divided by the communication target is verified. Thereafter, the authentication section 130 outputs the verified authentication data 21, 22, 23 . . . to the data combination section 120. The data combination section 120 combines the authentication data 21, 22, 23 . . . input from the authentication section 130 together. Thereafter, the data combination section 120 outputs the authentication data 21, 22, 23 . . . combined thereby to the authentication section 130.

The authentication section 130 of the present embodiment calculates the authentication rate of each of the authentication data 21 to 23 and so forth that have been received from the communication target. The authentication section 130 calculates, for example, a value obtained by dividing the number of pieces of authentication data that have succeeded in authentication by a number, which is specified as the division number of authentication data, as an authentication rate. When the authentication rate is calculated, the authentication section 130 gives authority according to the authentication rate calculated thereby to the communication target.

Furthermore, when the combined authentication data is input from the data combination section 120, the authentication section 130 verifies the combined authentication data based on the verification data input from the verification data generation section 110. When the combined authentication data is authenticated, the authentication section 130 combines the verification data input from the verification data generation section 110 together in specified order. Thereafter, the authentication section 130 finally authenticates the authentication data based on whether the verification data that have combined coincide with the combined authentication data.

From the fact that verification has been established, the authentication section 130 determines that authentication has been finally established. Thereafter, the authentication section 130 gives all the specified authorities to the vehicle control device 200 that is a communication target. Furthermore, the authentication section 130 allows the vehicle control device 100 to use, for example, all the communication data received by the vehicle control device 100 from the communication target.

The vehicle control device 200, which serves as an authenticated target in the present embodiment, has a communication section 201, which transmits and receives communication data to and from the vehicle control device 100 and so forth. The vehicle control device 200 additionally has an authentication data generation section 210, which generates authentication data to perform authentication with a communication target, and a data dividing section 220, which divides authentication data generated by the authentication data generation section 210. The vehicle control device 200 still additionally has a dummy data addition section 230, which performs a process of adding dummy data of authentication data divided by the data dividing section 220 to communication data.

For example, when the authentication data generation section 210 receives challenge data Dch transmitted by the vehicle control device 100, which is a communication target, the authentication data generation section 210 encrypts challenge data Dch received thereby by means of an encryption key 202. The authentication data generation section 210 outputs challenge data Dch encrypted thereby to the data dividing section 220 as response data with respect to the challenge data Dch. The encryption key 202 possessed by the vehicle control device 200 is key data common to the encryption key 102 possessed by the vehicle control device 100.

When response data is input, the data dividing section 220 divides this response data into a plurality of pieces of response data based on a specified rule. Thereafter, the data dividing section 220 outputs the pieces of response data divided thereby to the dummy data addition section 230. In the present embodiment, this response data is used as authentication data.

When the pieces of response data are input, the dummy data addition section 230 generates pieces of dummy data the number of which is the same as, for example, the division number of the response data. At this time, the dummy data addition section 230 generates dummy data so that, for example, the data amount of pieces of response data, i.e., the data amount of response data that has not yet been divided coincides with the data amount of pieces of dummy data.

Thereafter, the dummy data addition section 230 stores the pieces of response data input therein in the plurality of transmission frames F1, F3, F5, and the like, respectively. Furthermore, the dummy data addition section 230 stores the pieces of generated dummy data in the plurality of transmission frames F2, F4, and the like, respectively. Thereafter, the dummy data addition section 230 permutes the transmission frames F1 to F5 and so forth, for example, so that the response data and the dummy data are alternated with each other. The dummy data addition section 230 transmits each of the transmission frames permuted thereby to the vehicle control device 100. The dummy data addition section 230 stores the response data and the dummy data in specified places of the transmission frames F1 to F5 and so forth.

The authentication section 130 of the vehicle control device 100 thus receives the plurality of transmission frames transmitted by the dummy data addition section 230, and then discriminates between the response data and the dummy data that are stored in the plurality of transmission frames received therefrom. Thereafter, the authentication section 130 performs authentication based on the response data discriminated thereby.

Thereafter, with reference to FIGS. 2 and 3, a description will be given of the authentication mode of a communication target by means of the vehicle network authentication system and the vehicle network authentication method of the present embodiment.

Figure 2A:
FIG. 2A is a diagram showing authentication data that has not yet been divided.
Figure 2B:
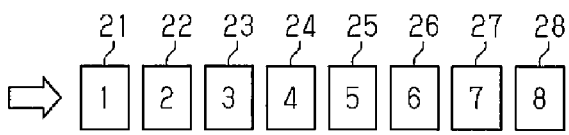
FIG. 2B is a diagram showing authentication data that has been divided.

As shown in FIG. 2A, when a piece of unified authentication data 20 is generated, the data dividing section 220 of the vehicle control device 200 divides the authentication data 20 into, for example, eight pieces of data 21 to 28 (FIG. 2B).

Figure 3A:
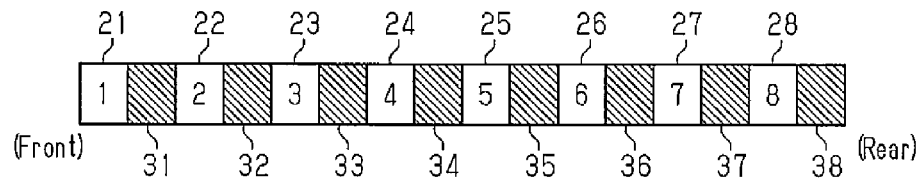
FIGS. 3A and 3B are diagrams each of which shows one example of the order of transmission of authentication data and dummy data that is determined based on a round-robin method.

As shown in FIG. 3A, the order of the authentication data 21 to 28 divided thereby is specified, for example, as the order of data transmission. Furthermore, the order of transmission of eight pieces of dummy data 31, 32, 33, 34, 35, 36, 37, and 38 is specified immediately after the pieces of authentication data 21, 22, 23, 24, 25, 26, 27, and 28 divided thereby, respectively. This order is specified based on a round-robin method.

Figure 3B:
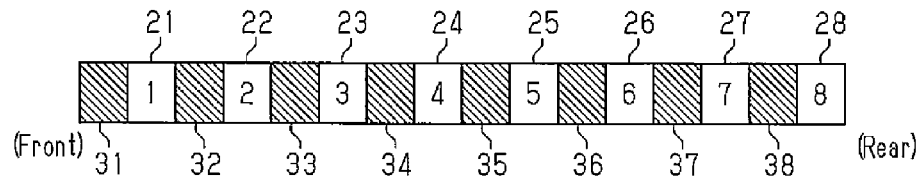

It is also possible that, as shown in FIG. 3B, the order of the authentication data 21 to 28 divided thereby is specified as the order of data transmission, and that the order of transmission of the eight pieces of dummy data 31, 32, 33, 34, 35, 36, 37, and 38 is specified immediately before the pieces of authentication data 21, 22, 23, 24, 25, 26, 27, and 28 divided thereby, respectively.

Figure 4A:
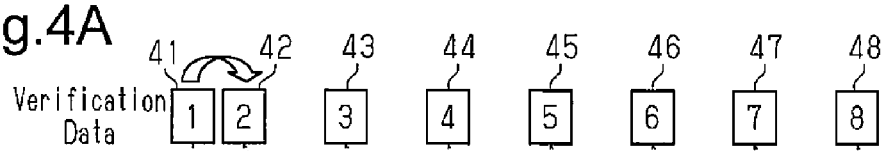
FIG. 4A is a diagram showing verification data and one example of the order of verification of the verification data.

Thereafter, as shown in FIG. 4A, the authentication section 130 of the vehicle control device 100 verifies the authentication data 21 to 28 by use of, for example, the eight pieces of verification data 41 to 48 generated and divided by the verification data generation section 110. Each of the pieces of verification data 41 to 48 is 8-bit data. Likewise, each of the pieces of authentication data 21 to 28 verified by the verification data 41 to 48 is 8-bit data.

Figure 4B:
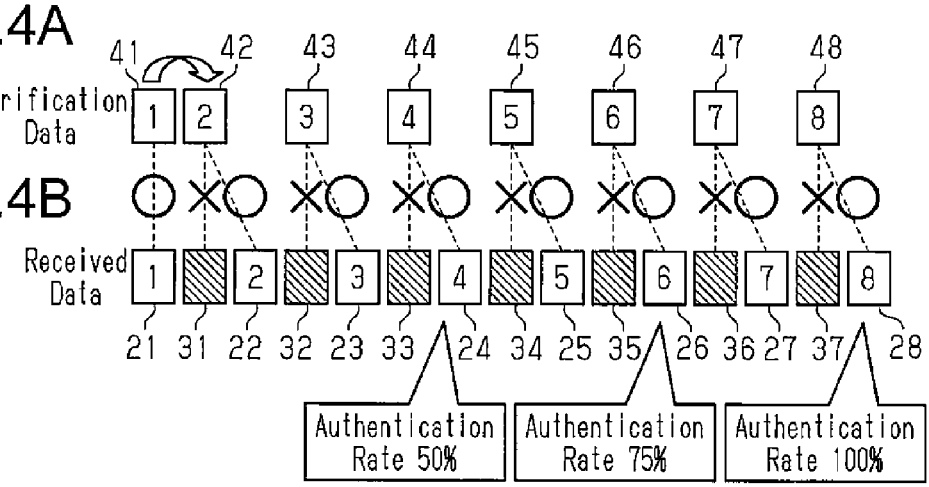
FIG. 4B is a diagram showing one example of authentication data to be verified and dummy data.

As shown in FIG. 4B, the authentication section 130 takes out each of the pieces of authentication data 21 to 28 and each of the pieces of dummy data 31 to 38 from each of the transmission frames received therefrom and then verifies the authentication data 21 to 28 and the dummy data 31 to 38 in order of reception.

First, the authentication section 130 verifies first authentication data 21 by use of first verification data 41, i.e., first 8-bit data. As a result, when the first verification data 41 and the first authentication data 21 coincide with each other, the authentication section 130 determines that, in the verification data 41 and in the authentication data 21, the same pieces of challenge data Dch have been encrypted by the same encryption keys 102 and 202, respectively. In other words, the authentication section 130 determines that the authentication data 21 is data returned from a genuine communication target that has the genuine encryption key 202.

Thereafter, when correctness has been verified, the authentication section 130 changes the data used for verification from the first verification data 41 to second verification data 42. The authentication section 130 recognizes the round-robin method by means of the authentication data generation section 210 of the vehicle control device 200 in advance. The authentication section 130 verifies whether the second verification data 42 coincides with the dummy data 31 received subsequently to the authentication data 21. Thereafter, from the fact that the second verification data 42 does not coincide with the dummy data 31, the authentication section 130 determines that the dummy data 31 is dummy.

Accordingly, the authentication section 130 sets the second authentication data 22 received subsequently to the dummy data 31 as a verification target. When the second verification data 42 coincides with the second authentication data 22, the authentication section 130 changes data used for verification from the second verification data 42 to third verification data 43.

Thereafter, the authentication section 130 verifies the dummy data 32 received immediately after the second authentication data 22 by use of the third verification data 43. Thereafter, from the fact that the dummy data 32 does not coincide with the third verification data 43, the third authentication data 23 received immediately after the dummy data 32 is set as a verification target.

When the third authentication data 23 has been thus verified by the third verification data 43, the dummy data 33 received immediately after the third verification data 43 is verified by fourth verification data 44.

In the present embodiment, the verification target is successively changed in this way. Additionally, whenever verification is established, the pieces of verification data 41 to 48 that have been divided are successively changed. As a result, the pieces of authentication data 21 to 28 are verified while discriminating between the pieces of authentication data 21 to 28 and the pieces of dummy data 31 to 38 that have been transmitted in specified order.

Thereafter, the authentication section 130 of the present embodiment determines that the authentication rate is, for example, 50% when verification using the fourth verification data 44 is established. As a result, the authentication section 130 gives authority according to the authentication rate of 50% to the vehicle control device 200. As a result, a minimum function based on communication between the vehicle control device 100 and the vehicle control device 200 is allowed before completing all the verifications of the pieces of authentication data 21 to 28 that have been divided. Furthermore, for example, the authentication section 130 allows the use of a part of the communication data received by the vehicle control device 100 from the vehicle control device 200. Thereafter, the vehicle control device 100 executes various application programs installed in the vehicle control device 100 by use of the communication data that has been allowed to be used.

When verification that uses sixth verification data 46 is established, the authentication section 130 of the present embodiment determines that the authentication rate is, for example, 75%. As a result, the authentication section 130 gives authority according to the authentication rate of 75% to the vehicle control device 200. Furthermore, for example, the authentication section 130 increases the available number of communication data received by the vehicle control device 100 from the vehicle control device 200.

When verification that uses eighth verification data 48 is established, the authentication section 130 of the present embodiment determines that the authentication rate is 100%. For example, the authentication section 130 allows the use of all the communication data received by the vehicle control device 100 from the vehicle control device 200.

Figure 4C:
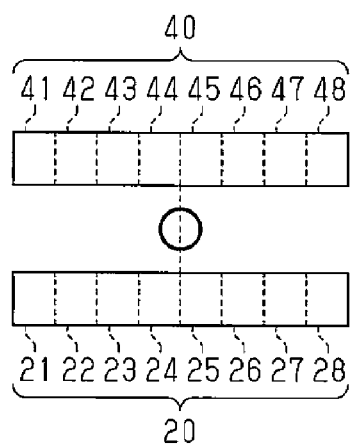
FIG. 4C is a diagram showing one example of verification data and authentication data that have been combined together.

When the verification of all the authentication data 21 to 28 is finished in this way, the pieces of verification data 41 to 48 are combined into a piece of verification data 40 that has not yet been divided and that is in a unified state as shown in FIG. 4C. Likewise, the pieces of authentication data 21 to 28 that have been divided are combined into a piece of authentication data 20 that has not yet been divided and that is in a unified state.

Thereafter, the single piece of authentication data 20 is verified by the single piece of verification data 40. Verification is established in this way, and then the authentication section 130 gives authority according to the final authentication to the vehicle control device 200. Furthermore, the authentication section 130 allows the vehicle control device 100 to execute all the application programs based on the communication data received from the vehicle control device 200.

Next, the process of the vehicle control device 100 that is on the authenticating side will be described with reference to FIG. 5.

Figure 5:
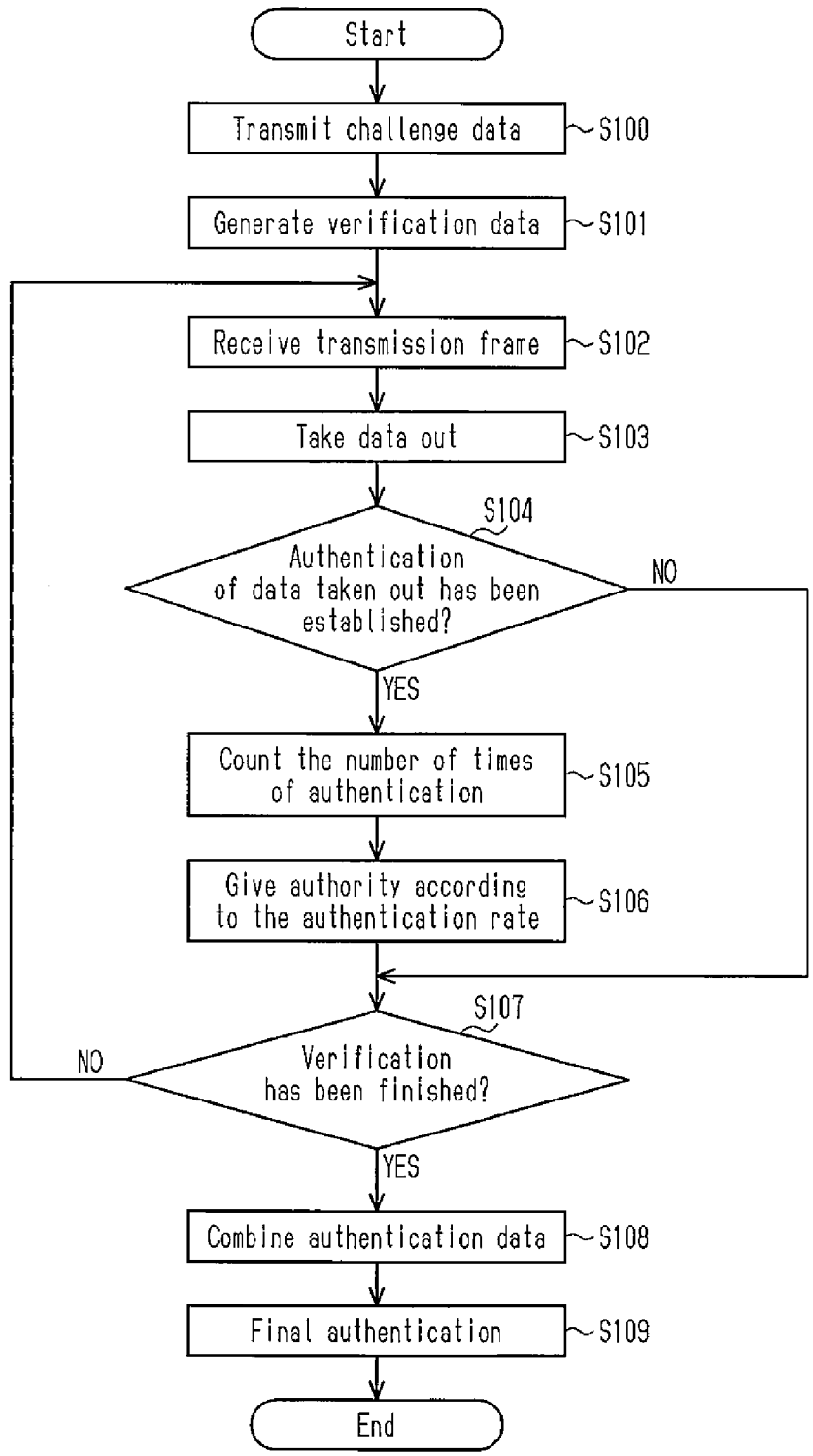
FIG. 5 is a flowchart showing one example of an authenticating process by means of a vehicle control device that serves as an authenticating entity (authentication target).

First, challenge data Dch generated by the verification data generation section 110 of the vehicle control device 100 is transmitted to the vehicle control device 200, which is a communication target (authenticated target), as shown in FIG. 5 as step S100.

Thereafter, the verification data generation section 110 encrypts the same data as the challenge data Dch transmitted to the vehicle control device 200 by use of the encryption key 102. As a result, verification data is generated (step S101). Furthermore, the verification data generation section 110 divides the generated verification data into a predetermined number of pieces of data in relation to a regular communication target.

Thereafter, the authentication section 130 of the vehicle control device 100 receives transmission frames in which response data and the like, are stored from the vehicle control device 200 as a response to the challenge data Dch (step S102), and then takes out the pieces of authentication data 21 to 28 and the pieces of dummy data 31 to 38 stored in specified positions among the transmission frames (step S103).

Thereafter, the authentication section 130 verifies the pieces of authentication data 21 to 28 and the pieces of dummy data 31 to 38 taken out therefrom while sequentially using the pieces of verification data 41 to 48 (step S104). Whenever it is determined that authentication has been established based on verification results (step S104: YES), the authentication section 130 counts the number of times of authentication (step S105). As a result, the verification data for use in verification is changed from the first verification data 41 to the second verification data 42 specified as a next turn.

Thereafter, the authentication rate is calculated, and authority according to the authentication rate is given (step S106).

Thereafter, it is determined whether the number of times of verification established has reached the division number of verification data and the division number of authentication data, i.e., it is determined whether the verification of all the pieces of authentication data that have been divided has been finished (step S107). The process of steps S102 to S107 is repeatedly performed until the verification of all the pieces of authentication data is finished. In the present embodiment, steps S104 to S107 correspond to an authentication step.

When the verification of all the pieces of authentication data is finished (step S107: YES), the pieces of authentication data 21 to 28 are combined together (step S108). The pieces of verification data 41 to 48 are also combined together.

Thereafter, the authentication data 20 is verified based on whether the combined and unified authentication data 20 and the combined and unified verification data 40 coincide with each other (step S109). When the verification of the authentication data 20 is established in this way, all the functions based on communication between the vehicle control device 100 and the vehicle control device 200 are allowed.

Next, the process of the vehicle control device 200 that is on the authenticated side will be described with reference to FIG. 6.

Figure 6:
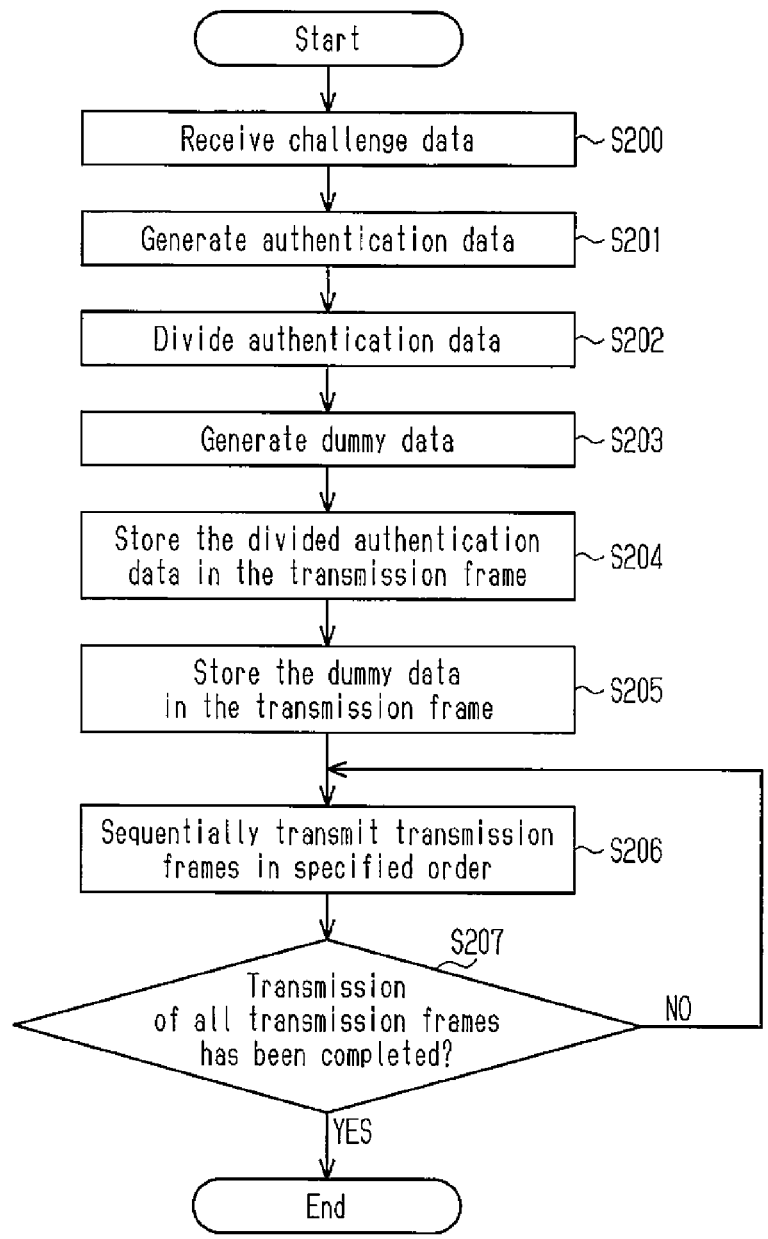
FIG. 6 is a flowchart showing one example of an authenticated process by means of a vehicle control device that serves as an authenticated entity (target to be authenticated).

When the vehicle control device 200 receives challenge data Dch (step S200), the authentication data generation section 210 of the vehicle control device 200 encrypts the challenge data Dch by means of the encryption key 202 as shown in FIG. 6. As a result, the authentication data 20 is generated (step S201).

Thereafter, the generated authentication data 20 is divided (step S202). The dummy data addition section 230 generates a plurality of pieces of dummy data 31 to 38 (step S203). In the present embodiment, step S202 corresponds to the dividing step mentioned above.

Thereafter, pieces of divided authentication data 21 to 28 are stored in specified positions of the transmission frames (step S204). The pieces of dummy data 31 to 38 are stored in specified positions of the transmission frames (step S205). In the present embodiment, steps S203 and S205 correspond to the dummy data addition step mentioned above.

Thereafter, the transmission frames in which the pieces of authentication data 21 to 28 are stored and the transmission frames in which the pieces of dummy data 31 to 38 are stored are alternately transmitted in specified order (step S206). When the number of transmission times of the transmission frames thus reaches the total value of the division number of the authentication data 20 and the number of the pieces of dummy data 31 to 38, this process is finished based on the conclusion that the transmission of all the frames has been completed (step S207: YES).

The operation of the vehicle network authentication system and that of the vehicle network authentication method of the present embodiment will be hereinafter described with reference to FIGS. 7 to 9.

Figure 7:
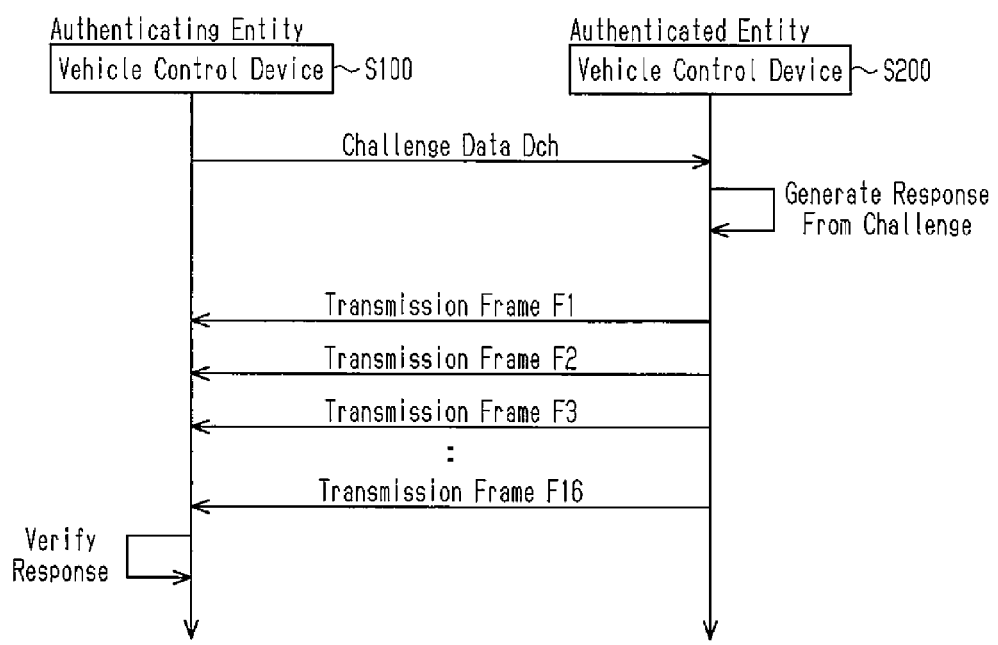
FIG. 7 is a sequence diagram showing one example of the authenticating process based on a challenge-response method that is performed between a vehicle control device that serves as an authenticating entity and a vehicle control device that serves as an authenticated entity.

As shown in FIG. 7, the vehicle control device 100 that serves as an authenticating entity transmits challenge data Dch to the vehicle control device 200, which serves as an authenticated entity.

The vehicle control device 200 receives the challenge data Dch, and then generates response data, i.e., authentication data by encrypting this challenge data Dch by means of the encryption key 202. The vehicle control device 200 divides the generated authentication data. Furthermore, the vehicle control device 200 generates, for example, pieces of dummy data the number of which is the same as the number of pieces of divided authentication data.

Figure 8:
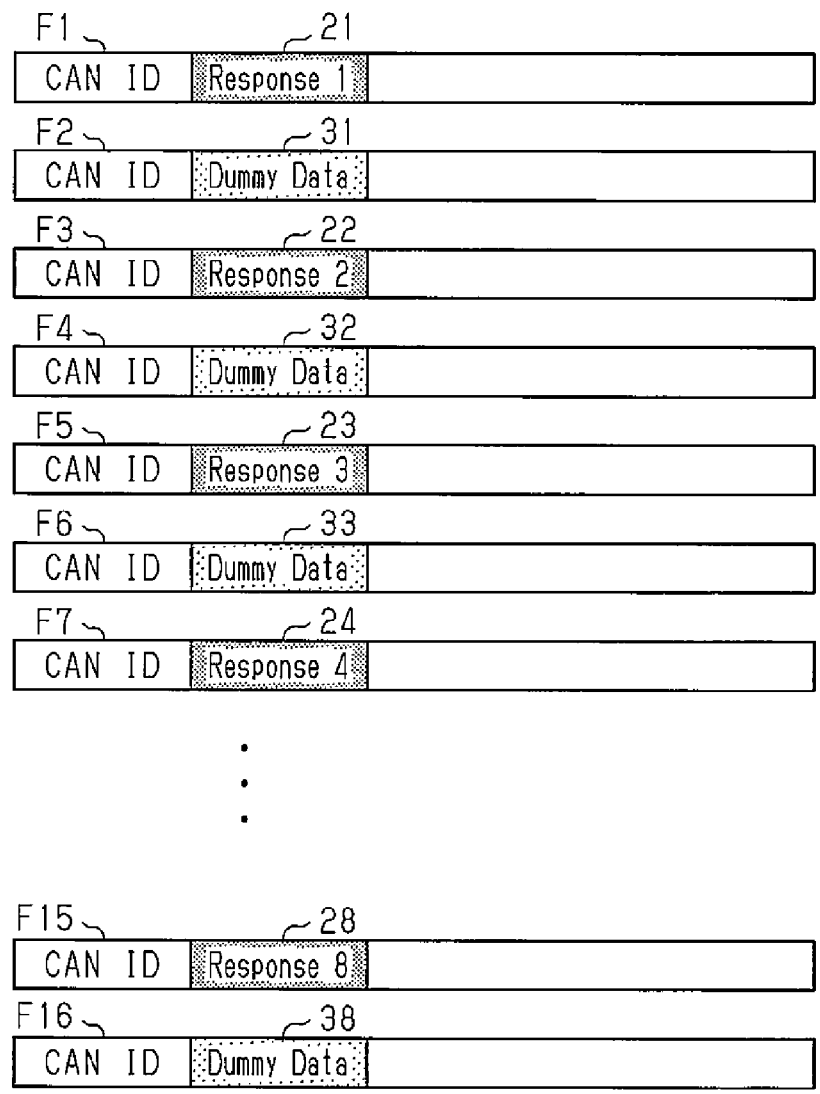
FIG. 8 is a diagram showing one example of authentication data and dummy data that are stored in transmission frames.

Thereafter, as shown in FIG. 8, the pieces of authentication data 21 to 28 in which the response data has been divided and the pieces of dummy data 31 to 38 are stored in specified positions among the frames F1 to F16 in specified order.

Thereafter, as shown in FIG. 7, the frames F1 to F16 are transmitted from the vehicle control device 200 to the vehicle control device 100.

The vehicle control device 100 receives the frames F1 to F16, and then takes out the pieces of authentication data 21 to 28 and the pieces of dummy data 31 to 38 stored in the frames F1 to F16. Thereafter, the vehicle control device 100 successively verifies the pieces of authentication data 21 to 28 and the pieces of dummy data 31 to 38 taken out by means of the pieces of verification data 41 to 48.

Figures 9, 10:
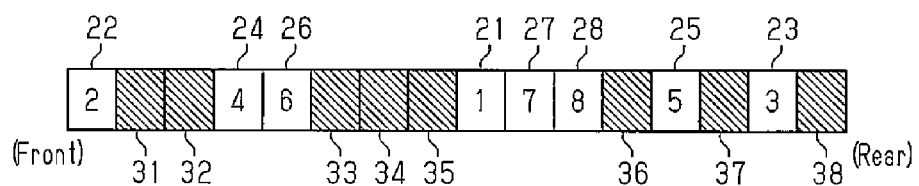
FIG. 9 is a diagram showing one example of authority given in accordance with the amount of authentication.
FIG. 10 is a diagram showing one example of the order of transmission of authentication data and dummy data that is determined based on a random method in a vehicle network authentication system and a vehicle network authentication method according to a second embodiment of the present invention.

As illustrated in FIG. 9, the vehicle control device 100 thus gives authority according to the authentication rate. As a result, functions capable of being used by the vehicle control device 100 and by the vehicle control device 200 become higher in proportion to an increase in the authentication rate to, for example, 30%, 50%, 75%, and 100%. Additionally, as a result, the management authority of application programs installed in the vehicle control device 100 gradually increases.

As described above, the vehicle network authentication system and the vehicle network authentication method according to the present embodiment make it possible to obtain the following advantages.

(1) The vehicle control device 200, which serves as an authenticated target, is provided with the data dividing section 220, which divides authentication data for authenticating a communication target and outputs the pieces of divided authentication data 21 to 28. The vehicle control device 200 was additionally provided with the dummy data addition section 230, which adds the pieces of dummy data 31 to 38 that are data to be transmitted to the vehicle network together with the pieces of authentication data 21 to 28. On the other hand, the vehicle control device 100, which serves as an authenticating target, is provided with the authentication section 130, which gives authority according to the amount of authentication of the authentication data 21 to 28. As a result, minimum necessary authority is given when a fixed amount of authentication is established, and a function processable based on the minimum necessary authority is maintained while performing authentication using the pieces of authentication data 21 to 28 and the pieces of dummy data 31 to 38. The pieces of dummy data 31 to 38 are transmitted to the vehicle network together with the pieces of authentication data 21 to 28, and therefore, when the authentication data 21 to 28 and the dummy data 31 to 38 are obtained by an unauthorized means, it becomes possible to cause the misconception that the pieces of dummy data 31 to 38 are normal authentication data after illicit obtainment. Therefore, it becomes difficult for the pieces of authentication data 21 to 28 to be identified from among the communication data, and the pieces of authentication data 21 to 28 are restrained from being illicitly used.

(2) The authentication section 130 performs authentication using the authentication data based on the challenge-response method. Therefore, the authentication is adequately performed while minimizing the number of times of communication performed between an authenticating target and an authenticated target in performing the authentication. As a result, the pieces of authentication data 21 to 28 that are verification targets are smoothly authenticated.

(3) In authenticating a communication target, the authentication section 130 of the vehicle control device 100 transmits the challenge data Dch based on the challenge-response method to the vehicle network. The authentication data generation section 210 of the vehicle control device 200 generates the response data based on the challenge data Dch. Thereafter, the data dividing section 220 generates the pieces of authentication data 21 to 28 by dividing the response data generated based on the challenge data Dch. Therefore, in the vehicle control device 200, which is an authenticated target, it becomes possible to generate the pieces of authentication data 21 to 28 based on the challenge data Dch transmitted from the vehicle control device 100. As a result, authentication is performed based on shared data that is recognizable only by the vehicle control device 100 and the vehicle control device 200 in which authentication is performed.

(4) The authentication section 130 is arranged in the vehicle control device 100, which is on the authenticating side. The data dividing section 220 and the dummy data addition section 230 are arranged in the vehicle control device 200, which is on the authenticated side. The authentication section 130 performs authentication, which is first authentication, to verify the correctness of the vehicle control device 200, which is on the authenticated side while setting the vehicle control device 200, which is on the authenticated side as a communication target. As a result, it becomes possible for the authentication section 130 to verify the correctness of the vehicle control device 200, which is a communication target, when communication is performed between the vehicle control device 100 and the vehicle control device 200. Additionally, as a result, it becomes possible to exert the minimum necessary function in the vehicle control device 100 or in the vehicle control device 200 before the end of all the authentications of the vehicle control device 200 when a predetermined amount of authentication is satisfied.

(5) The data dividing section 220 determined the order of transmission of the divided authentication data based on the round-robin method. This makes it possible for the authentication section 130 to easily discriminate between the pieces of divided authentication data 21 to 28 and the pieces of dummy data 31 to 38. Additionally, this makes it possible for the authentication section 130 to easily identify verification data used to verify the pieces of authentication data 21 to 28. Therefore, the process for the data verification of the pieces of authentication data 21 to 28 is performed more smoothly.

(6) The authentication section 130 verifies the correctness of data received in order of reception of data that is a verification target by use of the pieces of verification data 41 to 48 sequentially in order of transmission determined based on the round-robin method. Therefore, even if the pieces of divided authentication data 21 to 28 are different from each other and even if the pieces of divided authentication data 21 to 28 are different in data from each other, it becomes possible for the authentication section 130 to easily select verification data for verifying the pieces of authentication data 21 to 28.

(7) When a piece of verification data selected from the verification data 41 to 48 coincides with data that is a verification target, the authentication section 130 authenticates this data that is a verification target as partial data of the authentication data. Additionally, the authentication section 130 makes data received subsequently to the authentication data that has been authenticated as a verification target by use of verification data specified as being sequentially subsequent to the verification data used for authentication. This makes it possible for the authentication section 130 to verify the correctness of the pieces of authentication data 21 to 28 based on whether the pieces of verification data 41 to 48 coincide with the pieces of authentication data 21 to 28 used for verification. Additionally, this makes it possible to make data received subsequently to the authentication data that has been authenticated as a verification target by use of verification data specified as being sequentially subsequent to the verification data used for authentication when authentication is established. As a result, authentication that uses the pieces of verification data 41 to 48 is performed in order determined based on the round-robin method, and smooth authentication is realized.

(8) When a piece of verification data selected from the pieces of verification data 41 to 48 does not coincide with data that is a verification target, the authentication section 130 identifies this data that is a verification target as dummy data. This makes it possible for the authentication section 130 to identify that data not coinciding with the verification data is dummy data. Additionally, the authentication section 130 makes data received subsequently to the data identified as dummy data by use of the verification data used for authentication as a verification target. As a result, verification data used to identify dummy data is used to verify a following verification target, and it is identified whether this verification target is dummy data or authentication data. Therefore, this process is recursively performed, and, as a result, discrimination between the pieces of dummy data 31 to 38 and the pieces of authentication data 21 to 28 and the authentication of the pieces of authentication data 21 to 28 are smoothly performed.

(9) When all the authentications of the pieces of authentication data 21 to 28 are established, the authentication section 130 combines the pieces of authentication data 21 to 28 in which the authentication is established together in specified order. Additionally, the authentication section 130 combines the pieces of verification data 41 to 48 together in specified order. Still additionally, the authentication section 130 finally authenticates a communication target based on whether the combined authentication data 20 and the combined verification data 40 coincide with each other. As a result, multiplex authentication is performed by authentication based on the divided authentication data and authentication based on the combined authentication data. Therefore, security is made even higher.

(10) The authentication section 130 uses the authentication rate obtained from division results of the number of establishment of authentication with respect to the division number of the pieces of authentication data 21 to 28 as the amount of authentication. Therefore, it becomes possible to adequately give authority according to the degree of authentication even if the division number of the pieces of authentication data 21 to 28 changes.

(11) The authentication section 130 changes the management authority of an application program of the vehicle control device 100 in accordance with the amount of authentication. As a result, the minimum management authority based on the application program is given at an early stage to at least one of the vehicle control device 100 and the vehicle control device 200. Additionally, as a result, it becomes possible to give authority taking account of an authentication result based on a relatively large amount of authentication with respect to an important function while it is possible to execute a minimum function at an early stage.

(12) A CAN is employed as a vehicle network. This makes it possible to maintain security and makes it possible to give minimum necessary authority through authentication based on the amount of authentication even if it is a vehicle network, such as a CAN, having a great communication band or having great limitations on a transferable data amount.

Second Embodiment

Next, a vehicle network authentication system and a vehicle network authentication method according to a second present embodiment will now be described with reference to FIGS. 10 to 13, with an emphasis given to differences from the first embodiment. The vehicle network authentication system and the vehicle network authentication method according to the present embodiment are the same in the basic configuration as the first embodiment, and, in FIGS. 10 to 13, the same reference sign is given to substantially the same element as in the first embodiment, and an overlapping description is omitted.

As shown in FIG. 10, in the mode of the present embodiment, the order of transmission of pieces of authentication data 21 to 28 generated by the authentication data generation section 210 of the vehicle control device 200 is determined based on the random method. Likewise, the order of transmission of pieces of dummy data 31 to 38 is determined based on the random method.

As a result, the order of transmission of the pieces of authentication data 21 to 28 and the pieces of dummy data 31 to 38 is determined as being, for example, second authentication data 22, dummy data 31 and 32, fourth authentication data 24, sixth authentication data 26, and dummy data 33, 34, 35 . . . .

Figure 11:
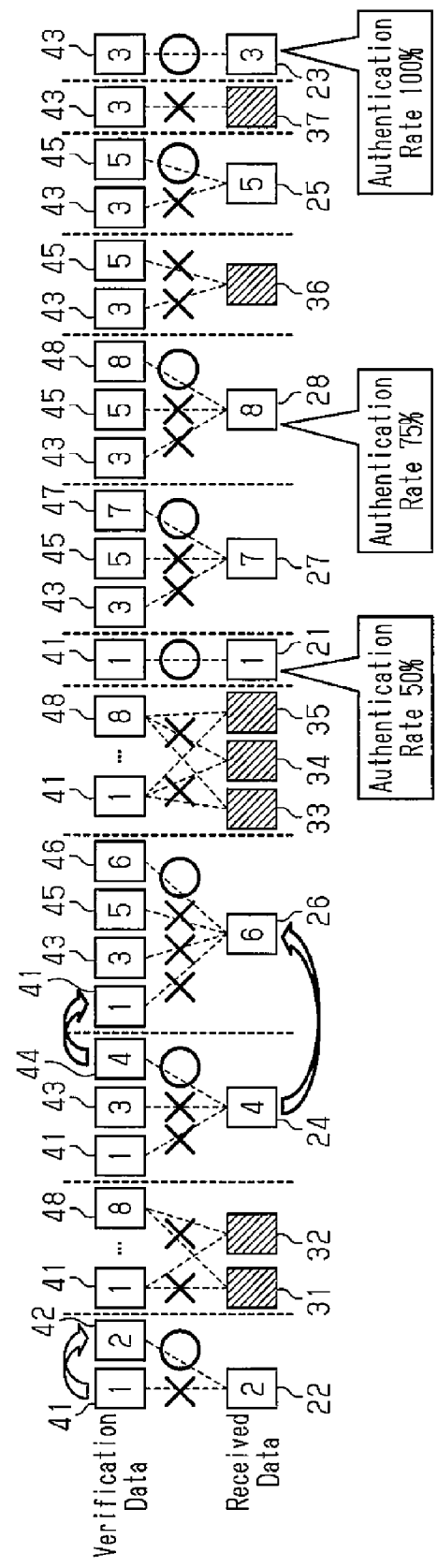
FIG. 11 is a diagram showing one example of the verifying process of authentication data and dummy data by means of verification data.

As shown in FIG. 11, when the pieces of authentication data 21 to 28 are verified, the authentication section 130 of the vehicle control device 100 of the present embodiment first verifies the second authentication data 22 first received. At this time, the authentication section 130 uses the first verification data 41 among the pieces of verification data 41 to 48.

Thereafter, from the fact that the first verification data 41 and the second authentication data 22 do not coincide with each other, the authentication section 130 verifies the data 21 that is a verification target by use of the second verification data 42 that is specified as a verification turn subsequent to the first verification data 41.

As a result, from the fact that the second verification data 42 coincides with the authentication data 22 that is set as a verification target, the authentication section 130 determines that authentication by means of the second verification data 42 has been established. Thereafter, the authentication section 130 identifies that the order of transmission of the authentication data 22 that is set as a verification target is 1, and calculates the authentication rate. Furthermore, the authentication section 130 excludes the second verification data 42 from data for use in the subsequent verification.

Thereafter, the authentication section 130 sets the dummy data 31 received subsequently to the first authentication data 22 in which authentication has been established as a verification target. At this time, first, the authentication section 130 performs verification by means of the first verification data 41. Thereafter, from the fact that the first verification data 41 and the data 31 set as a verification target do not coincide with each other, the authentication section 130 successively changes verification data for use in verification in a one-after-another manner, such as the fourth verification data 44 after the third verification data 43.

When it is not possible to authenticate the verification target by means of all the pieces of verification data 41, 43 to 48 except the second verification data 42 that has been excluded, the authentication section 130 identifies that the data 31 that is a verification target is dummy data. Thereafter, the authentication section 130 sets dummy data 32 received subsequently to the identified dummy data 31 as a verification target.

Likewise, from the fact that it is not possible to authenticate the data 32 by means of all the pieces of verification data 41, 43 to 48 except the second verification data 42 that has been excluded, the authentication section 130 identifies that the data 32 that is a verification target is dummy data. Thereafter, the authentication section 130 sets the fourth authentication data 24 received subsequently to the identified dummy data 32 as a verification target.

The authentication section 130 verifies the fourth authentication data 24 set as a verification target by sequentially using the pieces of verification data 41, 43, and 44 except the second verification data 42 that has been excluded. Thereafter, from the fact that the fourth authentication data 24 and the fourth verification data 44 coincide with each other, the authentication section 130 identifies that the data 24 set as a verification target is the fourth authentication data. Furthermore, the authentication section 130 calculates the authentication rate from the fact that the two pieces of authentication data 22 and 24 have been able to be verified.

All the pieces of authentication data 21 to 28 and the pieces of dummy data 31 to 38 received by the authentication section 130 are verified in this way. As a result, discrimination is made between the pieces of authentication data 21 to 28 and the pieces of dummy data 31 to 38. Additionally, as a result, the order before transmission prescribed for the pieces of authentication data 21 to 28 randomly transmitted is identified. This identified order is a data-forming order of the pieces of authentication data 21 to 28 forming the unified authentication data 20. This is prescribed in order of the authentication data 21 (first data)→the authentication data 22 (second data)→the authentication data 23 (third data) . . . .

As in FIG. 4C shown above, the pieces of verification data 41 to 48 are combined into the unified verification data 40 that has not yet been divided when the verification of all the pieces of authentication data 21 to 28 is thus finished. Likewise, the pieces of divided authentication data 21 to 28 are combined into the unified authentication data 20 that has not yet been divided. In this case, the pieces of authentication data 21 to 28 are combined in the identified order.

Thereafter, the one authentication data 20 is verified by the one verification data 40. When verification is established in this way, the authentication section 130 gives authority according to the final authentication to the vehicle control device 200. Furthermore, the authentication section 130 allows the vehicle control device 100 to execute all the application programs based on communication data received from the vehicle control device 200.

Next, the process of the vehicle control device 100, which is on the authenticating side, will be described with reference to FIG. 12.

Figure 12:
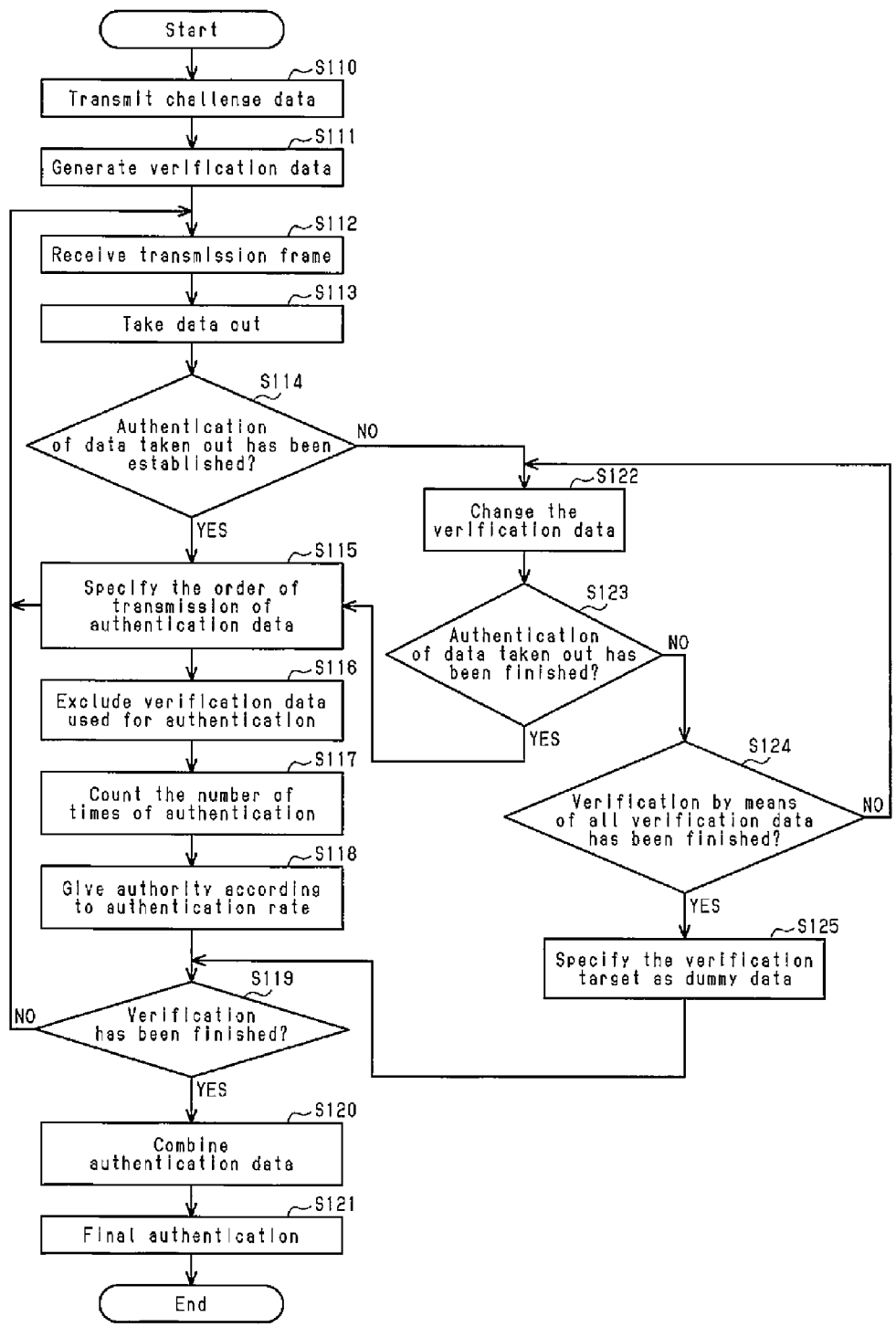
FIG. 12 is a flowchart showing one example of the authenticating process by means of a vehicle control device that serves as an authenticating entity.

First, challenge data Dch generated by the verification data generation section 110 of the vehicle control device 100 is transmitted to the vehicle control device 200, which is a communication target (authenticated target) as shown in FIG. 12 as step S110.

Thereafter, the verification data generation section 110 encrypts the same data as the challenge data Dch transmitted to the vehicle control device 200 by means of an encryption key 102. As a result, verification data is generated (step S111). Furthermore, the verification data generation section 110 divides the verification data 40 generated above into a predetermined number of pieces of data in relation to a regular communication target.

Thereafter, when transmission frames in which response data and the like, are stored as a response to the challenge data Dch are received from the vehicle control device 200, the authentication section 130 of the vehicle control device 100 takes out the pieces of authentication data 21 to 28 and the pieces of dummy data 31 to 38 stored in specified positions among the transmission frames (step S113).

Thereafter, the authentication section 130 sets data early in reception order among the pieces of authentication data 21 to 28 and the pieces of dummy data 31 to 38 taken out therefrom as a verification target (step S114). Thereafter, the data set as a verification target is successively verified by the pieces of verification data 41 to 48.

As a result, for example, when the first verification data 41 and the data set as a verification target coincide with each other and when the authentication of the verification target is established (step S114: YES), the data set as a verification target is identified as the first authentication data 21 (step S115). In other words, the order prescribed in the authentication data 21 is identified as 1. Furthermore, the first verification data 41 used for verification is excluded (step S116).

Thereafter, the number of times of authentication is counted, and authority according to the authentication rate is given to, for example, the vehicle control device 200 (steps S117 and S118).

On the other hand, when the authentication of the verification target has failed in step S114 (step S114: NO), the verification data is changed from the first verification data 41 to the second verification data 42 (step S122). Thereafter, the verification target is verified by the second changed verification data 42, and it is determined whether authentication has been established or not (step S123).

As a result, when authentication is established (step S123: YES), the verification target is identified as the second authentication data 22 (step S115). In other words, the order prescribed in the authentication data 22 is identified as 2. Furthermore, the second verification data 42 used for verification is excluded (step S116).

On the other hand, when it is determined that authentication is not established in step S123, it is determined whether verification by means of all the verification data except the verification data excluded in step S116 has been finished or not (step S124). When it is determined that verification by means of all the verification data has been finished (step S124: YES), the data set as a verification target is identified as dummy data (step S125). Thereafter, in step S119, it is determined whether the verification of all the received data has been finished.

On the other hand, when it is determined that verification by means of all the verification data has not yet been finished in step S124 (step S124: NO), the verification data is further changed (step S122). Until verification by means of all the verification data is finished or until authentication is established, the verification data is successively changed.

Thereafter, in step S119, it is determined whether the number of times of verification established has reached the division number of the verification data and that of the authentication data, i.e., it is determined whether the verification of all the divided authentication data has been finished. Until the verification of all the authentication data is finished, the process of steps S112 to S119 and S122 to S125 is repeatedly performed.

When the verification of all the authentication data has been finished in this way (step S119: YES), the pieces of authentication data 21 to 28 are combined together (step S120). The pieces of verification data 41 to 48 are also combined together.

Thereafter, the authentication data 20 is verified based on whether the combined and unified authentication data 20 and the combined and unified verification data 40 coincide with each other (step S121). When the verification of the authentication data 20 is established in this way, all the functions based on communication between the vehicle control device 100 and the vehicle control device 200 are allowed.

Next, the process of the vehicle control device 200, which is on the authenticated side, will be described with reference to FIG. 13.

Figure 13:
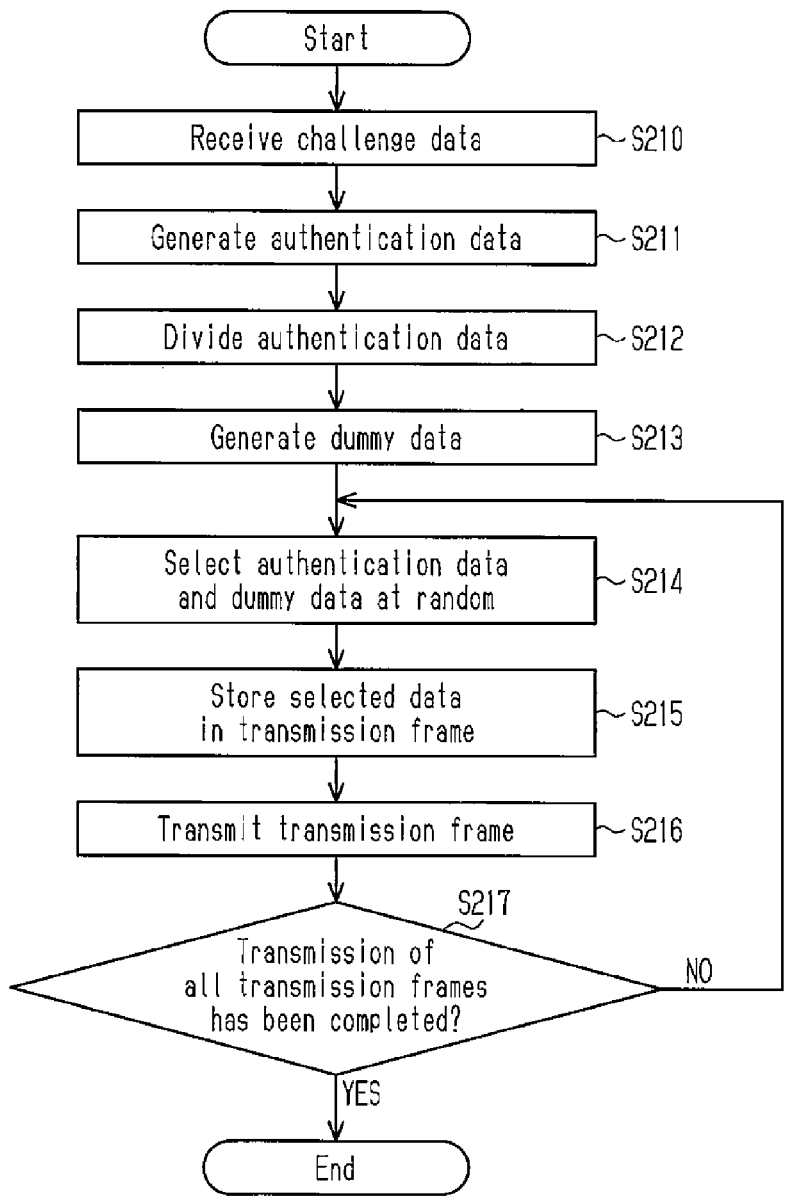
FIG. 13 is a flowchart showing one example of the authenticated process by means of a vehicle control device that serves as an authenticated entity.

When the vehicle control device 200 receives challenge data Dch (step S210), the authentication data generation section 210 of the vehicle control device 200 encrypts the challenge data Dch by means of the encryption key 202 as shown in FIG. 13. As a result, authentication data 20 is generated (step S211).

Thereafter, the generated authentication data 20 is divided (step S212). The dummy data addition section 230 generates a plurality of pieces of dummy data 31 to 38 (step S213).

Thereafter, in step S214, a piece of data is randomly selected from among pieces of divided authentication data 21 to 28 and pieces of divided dummy data 31 to 38. Thereafter, the data selected thereby is stored in a transmission frame, and is transmitted from the vehicle control device 200 to the vehicle control device 100 (steps S215 and S216).

Until the number of times of transmission of the transmission frame thus reaches the total value of the division number of the authentication data 20 and the number of pieces of dummy data 31 to 38, the pieces of authentication data 21 to 28 and the pieces of dummy data 31 to 38 are randomly selected and transmitted (steps S214 to S217).

When all the pieces of authentication data 21 to 28 and the pieces of dummy data 31 to 38 are transmitted, this process is ended (step S217: YES).

As described above, according to the vehicle network authentication system and the vehicle network authentication method according to the present embodiment, it becomes possible to obtain the advantages (1) to (4) and (9) to (12) mentioned above, and becomes possible to obtain the following advantages instead of the advantages (5) to (8) mentioned above.

(5A) The data dividing section 220 determines the order of transmission of the divided authentication data based on the random method. Therefore, it becomes difficult to discriminate between authentication data and verification data, and it becomes difficult to identify verification data for the verification of authentication data because the order of transmission of authentication data does not have regularity. As a result, even if authentication data and dummy data are obtained by an unauthorized means, this authentication data will be further restrained from being illegally used.

(6A) When the order of transmission of the pieces of authentication data 21 to 28 is determined based on the random method, the authentication section 130 verifies the correctness of the pieces of authentication data 21 to 28 by recursively using the pieces of verification data 41 to 48. Therefore, it becomes possible for the authentication section 130 to verify the pieces of authentication data 21 to 28 by means of the pieces of verification data 41 to 48 even when verification data corresponding to the pieces of authentication data 21 to 28 cannot be identified because the order of transmission cannot be identified.

(7A) When one piece of verification data selected from among the pieces of verification data 41 to 48 coincides with data set as a verification target, the authentication section 130 authenticates this data set as a verification target as one of the pieces of authentication data 21 to 28. Additionally, the authentication section 130 identifies that the order prescribed in this authentication data authenticated thereby is the order prescribed in the verification data used for this authentication. Still additionally, the authentication section 130 verifies data received subsequently to the authentication data authenticated thereby by use of verification data identified as being sequentially first among pieces of verification data except the verification data used for specification. Therefore, it is possible for the authentication section 130 to verify the correctness of the pieces of authentication data 21 to 28 based on whether the pieces of verification data 41 to 48 used for verification coincide with the pieces of authentication data 21 to 28. Additionally, the authentication section 130 performs recursive verification excluding the verification data used for established authentication from subsequent verification. Therefore, the number of pieces of verification data used recursively is reduced in proportion to the times of authentication establishment, and, accordingly, discrimination about whether the verification target is authentication data or dummy data is made early. Therefore, it becomes possible to perform smooth authentication although the order of transmission of pieces of authentication data is determined based on the random method.

(8A) When one piece of verification data selected from among the pieces of verification data 41 to 48 does not coincide with data set as a verification target, the authentication section 130 verifies the verification target while successively using other verification data except the verification data used for established authentication. Additionally, the authentication section 130 identifies the verification target as dummy data on condition that all the pieces of the verification data 41 to 48 and the verification target do not coincide with each other. Therefore, it becomes possible for the authentication section 130 to identify that the order prescribed in the verification data coinciding therewith is the order prescribed in the authentication data of which the authentication has been established. According to this, the order prescribed in authentication data transmitted at random is identified. In other words, it becomes possible for the authentication section to recognize which one of the pieces of authentication data has been authenticated. This process is performed recursively, and, as a result, the discrimination between the pieces of dummy data 31 to 38 and the pieces of authentication data 21 to 28 is smoothly performed, and the authentication of the pieces of authentication data 21 to 28 is smoothly performed.

Third Embodiment

Next, a vehicle network authentication system and a vehicle network authentication method according to a third present embodiment will now be described with reference to FIGS. 14 to 18, with an emphasis given to differences from the first embodiment. The vehicle network authentication system and the vehicle network authentication method according to the present embodiment are the same in the basic configuration as the first embodiment, and, in FIGS. 14 to 18, the same reference sign is given to substantially the same element as in the first embodiment, and an overlapping description is omitted.

Figure 14:
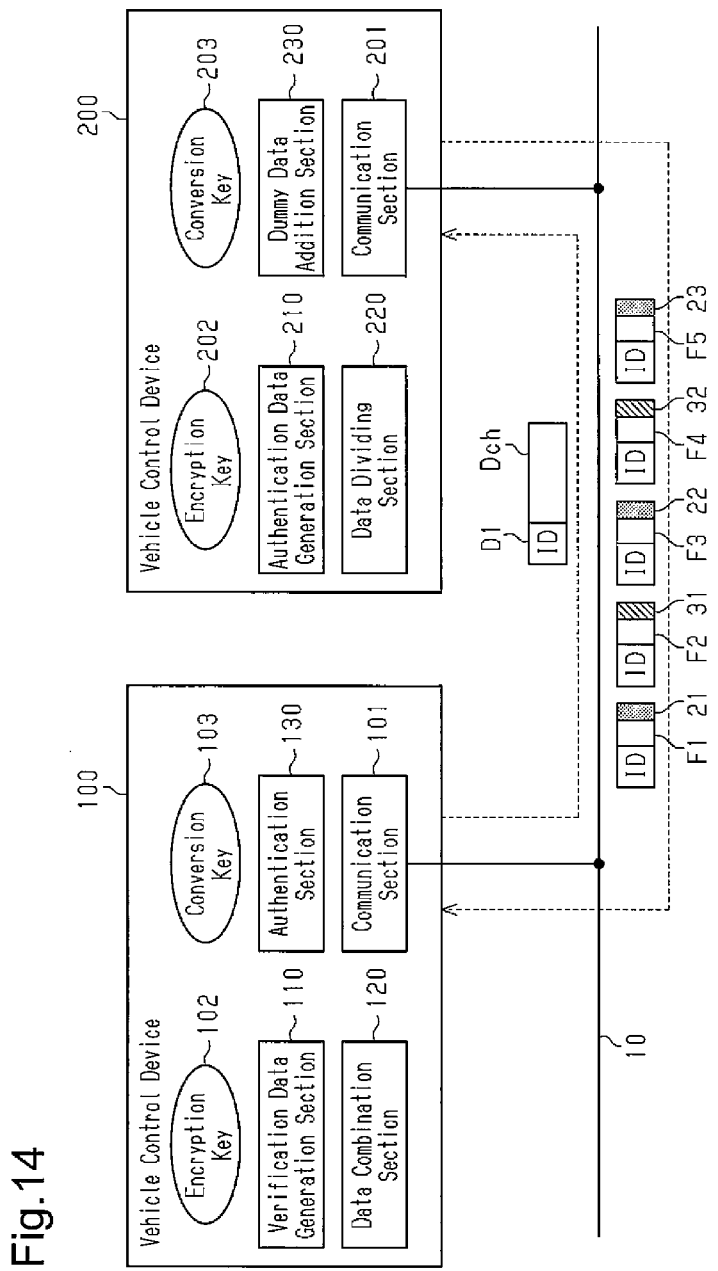
FIG. 14 is a block diagram showing a schematic configuration of a vehicle control device that serves as an authenticating entity and a vehicle control device that serves as an authenticated entity to which a vehicle network authentication system and a vehicle network authentication method according to a third embodiment of the present invention are applied.

As shown in FIG. 14, the vehicle control device 100 of the present embodiment has a conversion key 103 to convert communication data into new challenge data. The vehicle control device 200 of the present embodiment also has a conversion key 203 to convert communication data into new challenge data. The conversion key 103 and the conversion key 203 are key data shared therebetween.

The operation of the vehicle network authentication system and the operation of the vehicle network authentication method of the present embodiment will be hereinafter described with reference to FIGS. 15 to 18.

Figure 15:
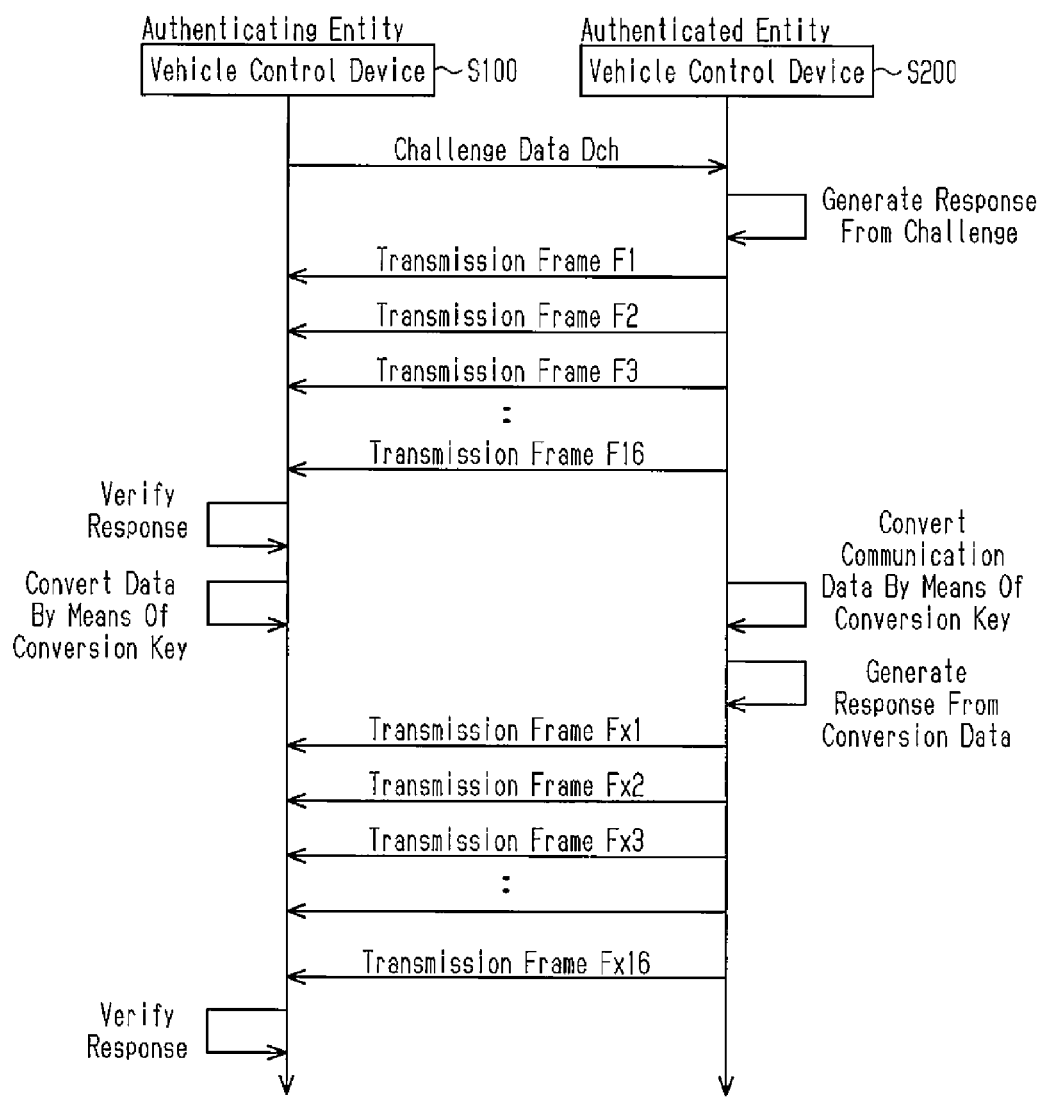
FIG. 15 is a sequence diagram showing one example of the authenticating process based on the challenge-response method that is performed between a vehicle control device that serves as an authenticating entity and a vehicle control device that serves as an authenticated entity.

As shown in FIG. 15, the vehicle control device 100 receives transmission frames F11 to F16 from the vehicle control device 200, and, when the authentication of the vehicle control device 200 is finished based on authentication data taken out from the transmission frames F11 to F16, the vehicle control device 100 generates new challenge data by means of the conversion key 103.

Here, as shown in FIG. 16, for example, pieces of communication data Dc1 to Dc16 showing the traveling speed of a vehicle are stored in predetermined positions of the transmission frames F11 to F16 transmitted by the vehicle control device 200.

Thereafter, when the authentication of the vehicle control device 200 is finished, the authentication section 130 of the vehicle control device 100 of the present embodiment takes out the pieces of communication data Dc1, Dc3, Dc5, Dc7, Dc9, Dc11, Dc13, and Dc15 stored in specified positions of the transmission frames F1, F3, F5, F7, F9, F11, F13, and F15 in which the pieces of authentication data 21 to 28 are stored. The position in which communication data is taken out from a transmission frame is predetermined between the vehicle control device 100 and the vehicle control device 200.

As shown in FIG. 17A, the authentication section 130 combines the pieces of communication data Dc1, Dc3, Dc5, Dc7, Dc9, Dc11, Dc13, and Dc15 taken out therefrom together. As a result, one piece of unified data is generated. Thereafter, the authentication section 130 converts the pieces of communication data Dc1, Dc3, Dc5, Dc7, Dc9, Dc11, Dc13, and Dc15 by use of the conversion key 103. When the data is converted, the authentication section 130 performs, for example, the XOR operation of the combined communication data and the conversion key 103.

As a result, as shown in FIG. 17B, conversion data DN in which the pieces of communication data Dc1, Dc3, Dc5, Dc7, Dc9, Dc11, Dc13, and Dc15 have been combined and converted is generated. Thereafter, the authentication section 130 specifies generated conversion data DNx as new challenge data.

Thereafter, as shown in FIG. 17C, the authentication section 130 generates conversion data DNx from the conversion data DN by allowing the conversion data DN and the encryption key 102 to undergo, for example, the XOR operation.

Furthermore, as shown in FIG. 17D, the authentication section 130 divides the one piece of unified conversion data DNx into, for example, eight pieces of conversion data DNx1 to DNx8. Thereafter, the authentication section 130 specifies the pieces of divided conversion data DNx1 to DNx8 as new verification data.

As shown in FIG. 15, when the transmission of the transmission frames F1 to F16 is completed, the authentication data generation section 210 of the vehicle control device 200 also generates conversion data DN through the calculation of the conversion key 203 and the pieces of communication data Dc1, Dc3, Dc5, Dc7, Dc9, Dc11, Dc13, and Dc15. The authentication data generation section 210 specifies the generated conversion data DN as new challenge data.

Furthermore, the authentication data generation section 210 generates conversion data DNx from the conversion data DN by allowing the conversion data DN and the encryption key 202 to undergo, for example, the XOR operation. The authentication data generation section 210 generates pieces of conversion data DNx1 to DNx8 by dividing the generated conversion data DNx into, for example, eight pieces of data. Thereafter, the authentication data generation section 210 specifies the pieces of divided data DNx1 to DNx8 as new response data, i.e., as authentication data.

As a result, the authentication section 130 of the vehicle control device 100 and the authentication data generation section 210 of the vehicle control device 200 obtain the pieces of conversion data DNx1 to DNx8 shared therebetween. Thereafter, based on these pieces of conversion data DNx1 to DNx8, the authentication section 130 performs the authentication of the communication data transmitted from the vehicle control device 200, i.e., performs message authentication.

As shown in FIG. 18, when second communication with the vehicle control device 100 is performed, the vehicle control device 200 stores the pieces of conversion data DNx1 to DNx8, which are new authentication data, in specified positions of the plurality of transmission frames Fx1 to Fx16 based on, for example, the round-robin method.

The pieces of communication data Dcx1, Dcx3, Dcx5, Dcx7, Dcx9, Dcx11, Dcx13, and Dcx15 are stored in specified positions of the pieces of transmission frames Fx1, Fx3, Fx5, Fx7, Fx9, Fx1, Fx13, and Fx15, respectively, in which the pieces of conversion data DNx1 to DNx8 are stored. In message authentication during third communication between the vehicle control device 100 and the vehicle control device 200, challenge data and response data are generated based on the pieces of communication data Dcx1, Dcx3, Dcx5, Dcx7, Dcx9, Dcx11, Dcx13, and Dcx15.

Accordingly, when the vehicle control device 200 transmits the transmission frames Fx1 to Fx16 as second communication, the vehicle control device 100 receives these transmission frames Fx1 to Fx16 as shown in FIG. 15.

Thereafter, the authentication section 130 of the vehicle control device 100 takes out the pieces of conversion data DNx1 to DNx8 stored in specified positions of the transmission frames Fx1, Fx3, Fx5, Fx7, Fx9, Fx11, Fx13, and Fx15. Thereafter, the authentication section 130 verifies the pieces of conversion data DNx1 to DNx8 taken out thereby by means of new verification data generated based on the encryption key 102 and the conversion key 103. As a result, the authentication section 130 performs message authentication with respect to the communication data transmitted from the vehicle control device 200.

Thereafter, the authentication section 130 calculates the authentication rate of the message authentication. The authentication section 130 changes, for example, the purpose of use of the communication data transmitted from the vehicle control device 200 in accordance with the authentication rate calculated thereby. As a result, application programs available based on the communication data increase, for example, in proportion to an increase in the authentication rate.

As described above, according to the vehicle network authentication system and the vehicle network authentication method according to the present embodiment, it is possible to obtain the advantages (1) to (12) mentioned above, and it also becomes possible to obtain the following advantages.

(13) Challenge data (DN) is generated based on part of the communication data transmitted at the first authentication. Thereafter, based on response data (DNx) generated based on this challenge data Dch, message authentication in the second and subsequent communications is performed. Therefore, the authentication section 130 of the vehicle control device 100 is not required to transmit the challenge data (DN) to the vehicle control device 200, which is an authenticated target, in the second and subsequent authentications. Therefore, the amount of communication in the second and subsequent authentications is reduced. Additionally, challenge data (DN) generated based on this communication data is also changed at any time because pieces of communication data (Dc1 to Dc15 and the like) are changed at any time. Therefore, the reliability of message authentication is further raised.

(14) The authentication section 130 of the vehicle control device 100 received the communication data (Dc1 to Dc16 and the like) transmitted from the vehicle control device 200, and, from the fact that authentication is established, the authentication section 130 updated the challenge data based on this communication data, i.e., the authentication section 130 performed an update from challenge data Dch to conversion data DN. From the fact that pieces of communication data (Dc1 to Dc16) are transmitted to the vehicle control device 100, the authentication data generation section 210 of the vehicle control device 200 performed an update of challenge data based on this communication data. Therefore, timing at which communication data is transmitted and received between the vehicle control device 100 and the vehicle control device 200 is timing shared therebetween, and therefore the challenge data is updated at timing shared between the vehicle control device 100 and the vehicle control device 200. As a result, when the challenge data is updated, there is no need to synchronize timing between the vehicle control device 100 and the vehicle control device 200. Therefore, the challenge data is updated more smoothly.

Other Embodiments

The above described embodiments may be modified as follows.

In the third embodiment mentioned above, communication data is converted through the XOR operation of the communication data and the conversion keys 103 and 203. Besides, it is possible to generate conversion data DNx based on an arbitrary calculating technique, such as arithmetic addition, multiplication, or division of the communication data and the conversion keys 103 and 203. In brief, it is only necessary to employ a calculating technique that is capable of converting communication data.

In the third embodiment mentioned above, conversion data DN converted by the conversion key 103 (conversion key 203) is encrypted by the encryption key 102 (encryption key 202), and pieces of divided conversion data DNx1 to DNx8 are used as response data and as verification data. Without being limited to this, the process in which the conversion data DN is encrypted by the encryption key 102 (encryption key 202) may be excluded. Additionally, the conversion data DN converted by the conversion key 103 (203) may be divided, and the resulting divided data may be used as response data and as verification data. This makes it possible to reduce the number of times of calculation and makes it possible to speed up authentication using the conversion key 103 (203).

In the third embodiment mentioned above, message authentication is performed as the second and subsequent authentications. Without being limited to this, the authentication of the vehicle control device 200, which serves as an authenticating entity of communication data, may be performed as the second and subsequent authentications.

In the third embodiment mentioned above, message authentication is performed when authentication based on the round-robin method is performed. Without being limited to this, message authentication may be performed when authentication based on the random method is performed. It is possible to perform message authentication based on the same process as the process shown in FIGS. 15 to 18 even when authentication based on the random method is performed.

In the third embodiment mentioned above, conversion data DN is generated based on pieces of communication data Dc1 to Dc16 differing from challenge data Dch transmitted by the authentication section 130. Without being limited to this, conversion data may be generated by allowing the conversion key 103 (the conversion key 203) to successively convert challenge data transmitted by the authentication section 130. According to this, the challenge data is encrypted in a multiplex manner, and hence is updated.

Figure 19A:
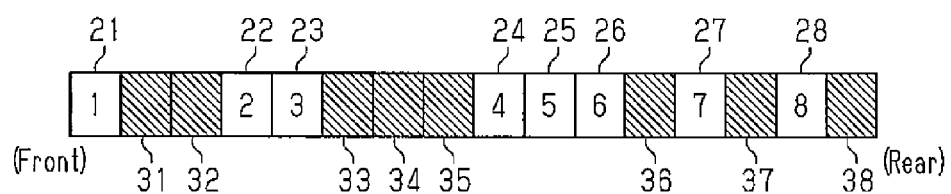
FIGS. 19A and 19B are diagrams each of which shows one example of the order of transmission of authentication data and dummy data.
Figure 19B:
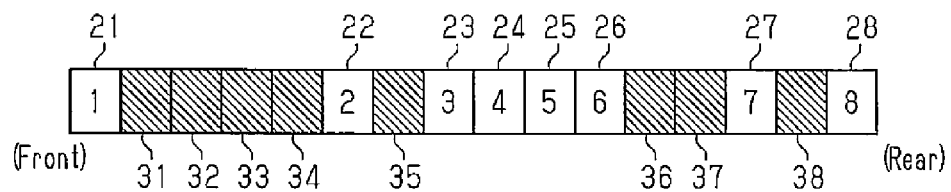

In the first and third embodiments mentioned above, the pieces of authentication data 21 to 28 and the pieces of dummy data 31 to 38 are alternately transmitted. Without being limited to this, the order of transmission of the pieces of dummy data 31 to 38 may be randomly specified as illustrated in FIG. 19A and FIG. 19B corresponding to FIG. 3 shown above. According to this, it becomes difficult to identify whether communication data is authentication data or dummy data, and the reliability of authentication is further raised. Likewise, in the second embodiment mentioned above, the order of transmission of the pieces of dummy data 31 to 38 may be randomly specified.

In each embodiment mentioned above, authentication data, verification data, and dummy data are each divided into eight pieces of data. Without being limited to this, the number of pieces into which each data is divided may be seven or less, or may be nine or more.

In each embodiment mentioned above, dummy data, verification data, and authentication data are each set to have the same number of pieces of data. Without being limited to this, the number of pieces of dummy data may differ from the number of pieces of verification data or may differ from the number of pieces of authentication data.

In each embodiment mentioned above, the authentication rate is calculated based on a division result of the number of times of establishment of authentication with respect to the number of pieces of authentication data divided. Besides, the authentication rate may be calculated based on a division result of the data amount of authentication data of which the authentication has been established with respect to the total data amount of authentication data. Additionally, the number of times authentication has been established may be used as the aforementioned amount of authentication data. Still additionally, authority may be given in accordance with the number of times authentication has been established. Besides, the data amount of authentication data used for established authentication may be used as the aforementioned amount of authentication data.

In each embodiment mentioned above, the vehicle control device 100 is provided with the data combination section 120. The authentication section 130 finally authenticated an authenticated target based on combined authentication data. Without being limited to this, a configuration in which the vehicle control device 100 does not include the data combination section 120 may be employed. Additionally, when the authentication rate reaches 100%, the authentication section 130 may determine that all the authentications of the authenticated target have been established.

In each embodiment mentioned above, the order of transmission of authentication data is specified based on the round-robin method and the random method. Besides, whenever authentication is finished, the order of transmission may be specified by switching between the round-robin method and the random method. In this case, it is only necessary for the authentication section 130 to recognize a rule according to which switching therebetween is performed. Besides, the order of transmission of the authentication data is merely required to conform to a predetermined rule between an authenticating entity and an authenticated entity, and is appropriately changeable.

In each embodiment mentioned above, authentication using authentication data is performed based on the challenge-response method. Without being limited to this, if a method in which a communication target is authenticated by using authentication data and verification data is employed, the present invention is applicable.

In each embodiment mentioned above, the authentication section 130 of the vehicle control device 100 set the single vehicle control device 200 as an authenticated target. Without being limited to this, the authentication section 130 may set a plurality of vehicle control devices as an authenticated target. Additionally, when multifunctional telephone apparatuses including a smartphone and pieces of outside equipment are connected to the vehicle network, the authentication section 130 may set these multifunctional telephone apparatuses and outside equipment as authenticated targets.

In each embodiment mentioned above, the verification data generation section 110, the data combination section 120, and the authentication section 130 are arranged in the vehicle control device 100. Additionally, the authentication data generation section 210, the data dividing section 220, and the dummy data addition section 230 are arranged in the vehicle control device 200. Without being limited to this, the verification data generation section 110, the data combination section 120, the authentication section 130, the data dividing section 220, and the dummy data addition section 230 may be located in both the vehicle control device 100 and the vehicle control device 200. Additionally, mutual authentication may be performed between the vehicle control device 100 and the vehicle control device 200.

In each embodiment mentioned above, the verification data generation section 110, the data combination section 120, the authentication section 130, the data dividing section 220, and the dummy data addition section 230 are arranged in the vehicle control device. Without being limited to this, the verification data generation section 110, the data combination section 120, the authentication section 130, the data dividing section 220, and the dummy data addition section 230 may be located in a gateway connected to the vehicle network.

In each embodiment mentioned above, authority to allow the use of communication data transmitted from the vehicle control device 200 is given to the vehicle control device 100 as authority according to the amount of authentication. Without being limited to this, authority to allow the transmission of communication data to the vehicle control device 100, which serves as an authenticating entity, may be given to the vehicle control device 200, which serves as an authenticated entity. Additionally, for example, authority to use a function possessed by the vehicle control device 100, which serves as an authenticating entity, may be given to the vehicle control device 200, which serves as an authenticated entity. Besides, if it is authority that can be given in accordance with the amount of authentication, it is possible to be targeted to be given.

In each embodiment mentioned above, communication data was transmitted and received with the frame as a unit. Without being limited to this, if communication data is transmitted and received with each unit of communication specified based on a communications protocol of the vehicle network, the present invention is applicable.

In each embodiment mentioned above, the CAN was employed as a vehicle network. Without being limited to this, if it is a vehicle network in which communication data is transmitted and received with each specified unit of communication, the present invention is applicable.

DESCRIPTION OF THE REFERENCE NUMERALS

10 . . . Communication line, 20 . . . Combined authentication data, 21 to 28 . . . Divided authentication data, 31 to 38 . . . Dummy data, 40 . . . Combined verification data, 41 to 48 . . . Verification data, 100 . . . Vehicle control device, 101 . . . Communication section, 102 . . . Encryption key, 103 . . . Conversion key, 110 . . . Verification data generation section, 120 . . . Data combination section, 130 . . . Authentication section, 200 . . . Vehicle control device, 201 . . . Communication section, 202 . . . Encryption key, 203 . . . Conversion key, 210 . . . Authentication data generation section, 220 . . . Data dividing section, 230 . . . Dummy data addition section.

The invention claimed is:

1. A vehicle network authentication system in which communication data is transmitted and received by use of communication specified based on a communications protocol of a vehicle network, the vehicle network authentication system comprising:
a data dividing section that divides authentication data for authenticating a communication target;
a dummy data addition section that adds dummy data for a dummy representation of the divided authentication data, the dummy data being used as data to be transmitted to the vehicle network together with the authentication data; and
an authentication section that verifies the divided authentication data and the dummy data by use of a plurality of pieces of verification data for verifying the divided authentication data, wherein the vehicle network is provided with a plurality of vehicle control devices including a first electronic control unit (first ECU) and a second electronic control unit (second ECU), the first ECU configured to authenticate the second ECU,
the data dividing section and the dummy data addition section are constructed by the second ECU and the authentication section is constructed by the first ECU,
wherein the authentication section is configured to obtain an authentication rate by at least one of i) dividing a number of pieces of authentication data that have succeeded in authentication by a division number of the authentication data and ii) dividing a data amount of authentication data that have succeeded in authentication by a total data amount of the authentication data, and
the authentication section is configured to increase functions capable of being used by the second ECU according to the authentication rate.

2. The vehicle network authentication system according to claim 1, wherein the authentication section performs authentication by use of the authentication data based on a challenge-response method.

3. The vehicle network authentication system according to claim 2, wherein
the authentication section transmits challenge data based on the challenge-response method to the vehicle network in order to authenticate a communication target, and
the data dividing section generates response data based on the challenge data transmitted to the vehicle network and generates the divided authentication data by dividing the generated response data.

4. The vehicle network authentication system according to claim 3, wherein
the authentication section performs first authentication with respect to a communication target based on the challenge data transmitted to the vehicle network, and performs second and subsequent authentication with respect to the communication target by using, as new challenge data, data in which at least one of communication data transmitted from the communication target and the challenge data has been converted by a common conversion key.

5. The vehicle network authentication system according to claim 4, wherein
as the first authentication, the authentication section performs authentication to verify correctness of the second ECU while using the second ECU as the communication target, and
as the second and subsequent authentication, the authentication section performs message authentication to verify correctness of the communication data while using communication data transmitted from the second ECU as the communication target.

6. The vehicle network authentication system according to claim 1, wherein, based on either the round-robin method or the random method, the data dividing section determines an order of transmission of the divided authentication data.

7. The vehicle network authentication system according to claim 6, wherein when the order of transmission of the pieces of divided authentication data is determined based on the round-robin method, the authentication section verifies correctness of received data in order of reception of data that is a verification target while using the pieces of verification data sequentially in order of transmission determined based on the round-robin method.

8. The vehicle network authentication system according to claim 7, wherein
- a1; the authentication section recursively performs a process in which, when one piece of verification data selected from the pieces of verification data and data that is set as a target to be verified coincide with each other, the authentication section authenticates the data that is set as a target to be verified as partial data of the authentication data, and sets, as a target to be verified, data received subsequently to the authentication data that has been authenticated by use of verification data specified as being sequentially subsequent to the verification data used for authentication, and
- b1; the authentication section recursively performs a process in which, when one piece of verification data selected from the pieces of verification data and data that is set as a target to be verified do not coincide with each other, the authentication section identifies, as the dummy data, the data that is set as a target to be verified, and sets, as a target to be verified, data received subsequently to the data identified as the dummy data by use of the verification data used for authentication.

9. The vehicle network authentication system according to claim 6, wherein when the order of transmission of the divided authentication data is determined based on the random method, the authentication section verifies correctness of the authentication data divided by the data dividing section by recursively using the pieces of verification data.

10. The vehicle network authentication system according to claim 9, wherein
- a2; the authentication section recursively performs a process in which, when one piece of verification data selected from the pieces of verification data and data that is set as a target to be verified coincide with each other, the authentication section authenticates the data that is set as a target to be verified as partial data of the authentication data, and identifies, as an order specified in the verification data used for authentication, an order specified in the authentication data that has been authenticated, and the authentication section sets, as a target to be verified, data received subsequently to the authentication data that has been authenticated by use of verification data specified as being sequentially first among the pieces of verification data except the verification data used for authentication, and
- b2; the authentication section recursively performs a process in which, when one piece of verification data selected from the pieces of verification data and data that is set as a target to be verified do not coincide with each other, the authentication section verifies the data that is set as a target to be verified by sequentially using other verification data except verification data that has been used for authenticating the authentication data, and the authentication section identifies, as the dummy data, the data that is set as a target to be verified on condition that all the verification data and the data that is set as a target to be verified do not coincide with each other.

11. The vehicle network authentication system according to claim 1, wherein
when all the authentications of the divided authentication data are established, the authentication section combines pieces of authentication data in which authentication has been established together in specified order, and combines the pieces of verification data together in the specified order, and
the authentication section performs final authentication with respect to a communication target based on whether the combined authentication data and the combined verification data coincide with each other.

12. The vehicle network authentication system according to claim 1, wherein
the authentication section changes management authority of an application program installed on at least one of the first ECU and the second ECU in accordance with the authentication rate.

13. A vehicle network authentication method in which communication data is transmitted and received by use of communication specified based on a communications protocol of a vehicle network, the vehicle network is provided with a plurality of vehicle control devices including a first electronic control unit (first ECU) and a second electronic control unit (second ECU), the vehicle network authentication method comprising:
- by the second ECU, dividing authentication data for authenticating a communication target;
- by the second ECU, adding dummy data for a dummy representation of the divided authentication data, the dummy data being used as data to be transmitted to the vehicle network together with the authentication data; and
- by the first ECU, discriminating between the divided authentication data and the dummy data to authenticate the second ECU;
- by the first ECU, obtaining an authentication rate by at least one of i) dividing a number of pieces of authentication data that have succeeded in authentication by a division number of the authentication data and ii) dividing a data amount of authentication data that have succeeded in authentication by a total data amount of the authentication data; and
- by the first ECU, increasing functions capable of being used by the second ECU according to the authentication rate.

14. The vehicle network authentication method according to claim 13, wherein, in increasing functions, authentication using the authentication data is performed based on a challenge-response method.

* * * * *